US011127952B2

(12) United States Patent
Takano et al.

(10) Patent No.: US 11,127,952 B2
(45) Date of Patent: Sep. 21, 2021

(54) CORE-SHELL STRUCTURE AND PRODUCTION METHOD THEREFOF, COMPOSITION FOR NEGATIVE ELECTRODE USING THE CORE-SHELL STRUCTURE AS NEGATIVE ELECTRODE ACTIVE MATERIAL, NEGATIVE ELECTRODE AND SECONDARY BATTERY

(71) Applicants: JNC CORPORATION, Tokyo (JP); JNC PETROCHEMICAL CORPORATION, Tokyo (JP)

(72) Inventors: Yoshihito Takano, Chiba (JP); Masakazu Kondo, Chiba (JP); Hirotsuna Yamada, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 140 days.

(21) Appl. No.: 16/449,455

(22) Filed: Jun. 24, 2019

(65) Prior Publication Data

US 2019/0393503 A1 Dec. 26, 2019

(30) Foreign Application Priority Data

Jun. 25, 2018 (JP) .............................. JP2018-120145

(51) Int. Cl.
*H01M 4/583* (2010.01)
*H01M 4/134* (2010.01)
(Continued)

(52) U.S. Cl.
CPC ........... *H01M 4/583* (2013.01); *H01M 4/131* (2013.01); *H01M 4/133* (2013.01); *H01M 4/134* (2013.01);
(Continued)

(58) Field of Classification Search
CPC ...... H01M 4/583; H01M 4/131; H01M 4/133; H01M 4/134; H01M 4/364; H01M 4/366; H01M 10/0525
See application file for complete search history.

(56) References Cited

U.S. PATENT DOCUMENTS

2014/0287315 A1\* 9/2014 Troegel ............... H01M 4/0404
429/231.8
2014/0349190 A1 11/2014 Kang
(Continued)

FOREIGN PATENT DOCUMENTS

CN 107863512 A \* 3/2018
JP 2015506561 3/2015
(Continued)

OTHER PUBLICATIONS

Machine Translation of CN107863512 (Mar. 17, 2021) (Year: 2021).\*

*Primary Examiner* — Matthew J Merkling
(74) *Attorney, Agent, or Firm* — JCIPRNET

(57) ABSTRACT

A material for a negative electrode active material having capability of achieving excellent cycle performance while maintaining satisfactory initial efficiency (initial capacity), a production method for the material, a composition for a negative electrode, using the material, a negative electrode, and a secondary battery. A core-shell structure that includes the following components (A) and (B), and satisfies the following conditions (i) and (ii): (A): a core containing at least Si (silicon), O (oxygen) and C (carbon) as a constituent element, and containing crystalline carbon and non-crystalline carbon as a constituent; and (B): a shell encapsulating the core, and including a SiOC structure having a graphene layer, and (i): having an atomic composition represented by formula $SiO_xC_y$ ($0.5<x<1.8$, $1.0<y<5.0$), and (ii): having a predetermined value of less than $1.0 \times 10^5$ Ω·cm in specific resistance determined by powder resistance measurement.

16 Claims, 7 Drawing Sheets

(51) Int. Cl.
    *H01M 4/36*     (2006.01)
    *H01M 4/131*     (2010.01)
    *H01M 4/133*     (2010.01)
    *H01M 10/0525*     (2010.01)
    *H01M 4/02*     (2006.01)

(52) U.S. Cl.
    CPC ........... *H01M 4/364* (2013.01); *H01M 4/366* (2013.01); *H01M 10/0525* (2013.01); *H01M 2004/027* (2013.01)

(56) References Cited

U.S. PATENT DOCUMENTS

| | | | |
|---|---|---|---|
| 2015/0214548 A1 | 7/2015 | Ohno et al. | |
| 2016/0056451 A1* | 2/2016 | Singh | H01M 4/131 |
| | | | 429/162 |
| 2017/0047584 A1* | 2/2017 | Hwang | H01M 4/366 |
| 2017/0320744 A1* | 11/2017 | Haon | H01M 4/136 |

FOREIGN PATENT DOCUMENTS

| | | |
|---|---|---|
| JP | 2017062974 | 3/2017 |
| KR | 20140009681 | 1/2014 |
| KR | 20140096581 | 8/2014 |
| WO | 2014002602 | 1/2014 |
| WO | 2016071462 | 5/2016 |

\* cited by examiner

CORE-SHELL STRUCTURE AND PRODUCTION METHOD THEREFOF, COMPOSITION FOR NEGATIVE ELECTRODE USING THE CORE-SHELL STRUCTURE AS NEGATIVE ELECTRODE ACTIVE MATERIAL, NEGATIVE ELECTRODE AND SECONDARY BATTERY

CROSS-REFERENCE TO RELATED APPLICATION

This application claims the priority benefit of Japan application serial no. 2018-120145, filed on Jun. 25, 2018. The entirety of the above-mentioned patent application is hereby incorporated by reference herein and made a part of this specification.

TECHNICAL FIELD

The invention relates to a core-shell structure and a production method therefor, and a composition for a negative electrode, in which the core-shell structure is used as a negative electrode active material, a negative electrode and a secondary battery. More specifically, the invention relates to a SiOC-based core-shell structure containing (A): a core containing crystalline carbon and non-crystalline carbon as a constituent and (B): a shell formed by encapsulating the core and including a SiOC structure having a graphene layer to exhibit a value of specific resistance within a predetermined range in powder resistance measurement, and a production method therefor, and a composition for a negative electrode, in which the core-shell structure is used, and a negative electrode, and a secondary battery.

BACKGROUND ART

In various electronic devices and communication devices and an eco-friendly car such as a hybrid vehicle, a secondary battery has been utilized as a driving power supply. As such a secondary battery, development progresses mainly on various lithium ion batteries in which a lithium intercalation compound that releases a lithium ion from an interlayer is used as a positive electrode material, and a carbonaceous material (for example, graphite) that can absorb and release the lithium ion into and from the interlayer between crystal planes during charge and discharge is used as a negative electrode material, and the lithium ion batteries also have been put into practical use.

Under the background described above, in association with size reduction of various electronic devices and communication devices and rapid spread of a hybrid vehicle and the like, development has been recently strongly required on a secondary battery having higher capacity and further improved various battery characteristics such as cycle performance and discharge rate characteristics as a driving power supply for the devices. In order to achieve such a high performance secondary battery, research and development focusing particularly on a negative electrode active material is continuously performed, and the technology as described below is known, for example.

For example, Patent literature No. 1 discloses a negative electrode active material containing a silicon oxide-based composite material obtained by heat-treating a silicon compound having a predetermined polysilsesquioxane structure under an inert gas atmosphere. More specifically, the silicon oxide-based composite material contained in the negative electrode active material has a carbon-silicon oxide nanodomain structure in which scattering is recognized in a predetermined region in a spectrum obtained by measurement by an X-ray small angle scattering method, and the structure is specified by presence of a peak intensity ratio $I_D/I_G$ of a D band to a G band in a predetermined range, suggesting existence of crystalline carbon and non-crystalline carbon in a spectrum obtained by Raman spectroscopy. Patent literature No. 1 shows that, if such a specific silicon oxide-based composite material is used as the negative electrode active material, charging and discharging capacity and a capacity retention ratio are improved in a lithium ion secondary battery.

Further, Patent literature No. 2 discloses a SiOC composite material in microparticulate form, the SiOC composite material having a structure in which silicon particles are embedded in an amorphous SiOC matrix specified by a predetermined elemental composition formed of Si, O and C, and coated with a non-crystalline carbon layer, an electrode active material containing the SiOC composite material, and so forth. The SiOC composite material disclosed in Patent literature No. 2 is specifically produced according to the procedures as described below. More specifically, silicon powder is mixed with synthesized polysilsesquioxane, or silicon powder is added during synthesizing polysilsesquioxane to obtain silicon particle-coated or composite polysilsesquioxane. Subsequently, a silicon particle-containing SiOC composite material is obtained by heat-treating the silicon particle-coated or composite polysilsesquioxane, and the composite material is further coated with an organic carbon precursor of polyvinyl alcohol (PVA) or the like and then heat-treated to form a non-crystalline carbon layer on a surface of the composite material. Patent literature No. 2 shows that, if such a SiOC composite material is used as a negative electrode active material, high capacity and good cycle performance are achieved in a lithium ion battery.

Further, Patent literature No. 3 discloses a negative electrode active material for a nonaqueous electrolyte secondary battery, which is formed of a ceramic composite material formed of dispersion of metallic silicon and SiC in SiOC ceramics, in which, when peak intensity of a (111) plane diffraction line of the metallic silicon is taken as b1 and peak intensity of a (111) plane diffraction line of the SiC is taken as b2 in X-ray diffraction using a CuKα characteristic x-rays, a ratio represented by b1/b2 is in the range of 0.20 to 10.00, and density in being compressed at 30 MPa is 1.2 g/cm$^3$ to 1.8 g/cm$^3$. Patent literature No. 3 suggests that, if a SiOC composite material containing components of the metallic silicon and the SiC as described above and specified by the range of various parameters is used as the negative electrode active material, excellent initial efficiency, discharging capacity and cycle performance can be developed in the secondary battery.

Further, Patent literature No. 4 discloses a production method for a negative electrode active material, in which a SiOx-C complex is used as a base. In the method, SiCl$_4$ and ethylene glycol are mixed and formed into gel, and then the resulting gel is heat-treated at a predetermined temperature to prepare silicon oxide, and the silicon oxide is further complexed with graphite, pitch, graphene or the like to obtain the SiOx-C complex. Patent literature No. 4 suggests that, if the SiOx-C complex having such a configuration is used as the negative electrode active material, improvement in a mechanical life and battery characteristics can be expected.

Further, Patent literature No. 5 describes a complex having a core-shell dual structure formed of a silicon core and a carbon shell. The complex is obtained by complexing nanosilicon with a graphene worm, in which the core is formed of silicon, and the shell is formed of a graphene structure.

CITATION LIST

Patent Literature

Patent Literature No. 1: WO 2014/002602 A.
Patent Literature No. 2: WO 2016/071462 A.
Patent Literature No. 3: JP 2017-62974 A.
Patent Literature No. 4: JP 2015-506561 A.
Patent Literature No. 5: KR 2014-009681 A.

SUMMARY OF INVENTION

Technical Problem

As described above, in association with size reduction of various electronic devices and communication devices and rapid spread of a hybrid vehicle and the like, further improvement in various battery characteristics such as initial efficiency and cycle performance is always required in a secondary battery adopted as a driving power supply for the devices, and above all, research and development focusing on a negative electrode active material are active.

Under such a situation, the present inventors are also developing various negative electrode active materials, including Patent literature No. 1 and Patent literature No. 2, and have continued to conduct examination focusing on various production steps for mass production in an industrial scale particularly on the negative electrode active material using a SiOC composite material. In the examination focusing on the production steps, the present inventors have found that, if a heating rate is changed upon applying heat treatment to polysilsesquioxane serving as a raw material to be converted into the SiOC composite material, a difference is produced in a structure, a component or the like of the SiOC composite material produced, and when heating and heat treatment of the polysilsesquioxane are further performed at a heating rate in a specific range, a SiOC-based core-shell structure having a specific structure and component composition is produced. Furthermore, the present inventors have also found that, when the core-shell structure is used as the negative electrode active material in the secondary battery, excellent cycle performance can be achieved while good initial efficiency (initial capacity) is maintained.

More specifically, the invention has been completed on the basis of the finding described above, and the invention provides a material for a negative electrode active material, in which excellent cycle performance can be achieved while good initial efficiency (initial capacity) is maintained, and a production method for the material, and a composition for a negative electrode, in which the material is used as the negative electrode active material, and a negative electrode, and a secondary battery.

Solution to Problem

In order to solve the problem described above, the invention provides items described below.

Item 1. A core-shell structure, containing the following components (A) and (B), and satisfying conditions (i) and (ii):

(A): a core containing at least Si (silicon), O (oxygen) and C (carbon) as a constituent element, and containing crystalline carbon and non-crystalline carbon as a constituent; and (B): a shell encapsulating the core, and including a SiOC structure having a graphene layer; and (i): having an atomic composition represented by formula $SiO_xC_y$ (0.5<x<1.8, 1.0<y<5.0); and (ii): having a predetermined value of less than $1.0 \times 10^5$ Ω·cm in specific resistance determined by powder resistance measurement.

Item 2. The core-shell structure according to item 1, wherein volume resistivity determined by powder resistance measurement has a predetermined value of 1.0 Ω·cm or less.

Item 3. The core-shell structure according to item 1 or 2, wherein an intensity ratio $H_G/H_m$ in a Raman spectroscopy spectrum has a predetermined value of 1.80 or more.

Item 4. The core-shell structure according to any one of items 1 to 3, wherein an intensity ratio $H_G/H_m$ in a Raman spectroscopy spectrum has a predetermined value of 2.20 or more.

Item 5. The core-shell structure according to any one of items 1 to 4, wherein the core and the shell are chemically bonded.

Item 6. The core-shell structure according to any one of items 1 to 5, wherein a peak intensity ratio $H_D/H_G$ in a Raman spectroscopy spectrum has a predetermined value of less than 1.50.

Item 7. The core-shell structure according to any one of items 1 to 6, wherein a C/Si molar ratio is 1.35 or more.

Item 8. The core-shell structure according to any one of items 1 to 7, wherein a C/Si molar ratio in the core is smaller than a C/Si molar ratio in the shell.

Item 9. The core-shell structure according to any one of items 1 to 8, wherein the shell includes an intermediate layer positioned on a surface of the core and a surface layer positioned on the intermediate layer, and the core, the intermediate layer and the surface layer each are characterized by a difference in a content ratio of C (carbon), and satisfy a relationship: (C/Si molar ratio in the core)<(C/Si molar ratio in the surface layer)<(C/Si molar ratio in the intermediate layer).

Item 10. The core-shell structure according to any one of items 1 to 9, wherein the core-shell structure has a shape of substantially spherical particles, and a particle size is in a range of 100 nanometers to 50 micrometers.

Item 11. A composition for a negative electrode, containing the core-shell structure according to any one of items 1 to 10 as a negative electrode active material.

Item 12. The composition for the negative electrode according to item 11, further containing a carbon-based conductivity agent and/or a binder.

Item 13. A negative electrode, containing the composition for the negative electrode according to item 11 or 12.

Item 14. A secondary battery, comprising at least one negative electrode according to item 13.

Item 15. The secondary battery according to item 14, being a lithium ion secondary battery.

Item 16. A method for producing the core-shell structure according to any one of items 1 to 10, including the following step (q-1) or (q-2):

step (q-1): an organosilicon compound having a polysilsesquioxane structure represented by formula (I) is heated to a temperature of 800° C. or higher at a heating rate of 100° C. per minute or more under a non-oxidizing gas atmosphere, and then heat-treated at the temperature for 1 hour or more; and step (q-2): the organosilicon compound having the polysilsesquioxane structure represented by formula (I) is exposed to a non-oxidizing gas atmosphere previously heated to a temperature of 800° C. or higher, and then heat-treated at the temperature for 1 hour or more;

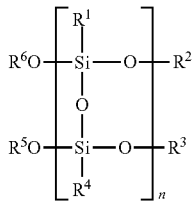

wherein, $R^1$ and $R^4$ are each independently selected from the group of substituted or unsubstituted alkyl having 1 to 45 carbons, substituted or unsubstituted aryl and substituted or unsubstituted arylalkyl, and in the alkyl having 1 to 45 carbons, arbitrary hydrogen may be replaced by halogen, and arbitrary —$CH_2$— may be replaced by —O—, —CH=CH—, cycloalkylene or cycloalkenylene, and in the alkylene in the substituted or unsubstituted arylalkyl, arbitrary hydrogen may be replaced by halogen, and arbitrary —$CH_2$— may be replaced by —O—, —CH=CH— or cycloalkylene, $R^2$, $R^3$, $R^5$ and $R^6$ are each independently selected from the group of hydrogen, substituted or unsubstituted alkyl having 1 to 45 carbons, substituted or unsubstituted aryl and substituted or unsubstituted arylalkyl, and in the alkyl having 1 to 45 carbons, arbitrary hydrogen may be replaced by halogen, and arbitrary —$CH_2$— may be replaced by —O—, —CH=CH—, cycloalkylene, cycloalkenylene or —$SiR^1{}_2$—, and in the alkylene in the substituted or unsubstituted arylalkyl, arbitrary hydrogen may be replaced by halogen, and arbitrary —$CH_2$— may be replaced by —O—, —CH=CH—, cycloalkylene, cycloalkenylene or —$SiR^1{}_2$—, and n represents an integer of 1 or more.

Item 17. The method according to item 16, including step (q-1), wherein, in the step (q-1), the organosilicon compound is heated to a temperature of 800° C. or higher at a heating rate of 500° C. per minute or more under a non-oxidizing gas atmosphere, and then heat-treated at the temperature for 1 hour or more.

Item 18. The method according to item 16 or 17, including step (q-1), wherein, in the step (q-1), the organosilicon compound is heated to a predetermined temperature in a range of 950° C. to 1,500° C. at a heating rate of 500° C. per minute or more under a non-oxidizing gas atmosphere, and then heat-treated at the temperature for 1 hour or more.

Item 19. The method according to any one of items 16 to 18, including step (q-2), wherein, in the step (q-2), the organosilicon compound is moved from an environment of 600° C. or lower to the non-oxidizing gas atmosphere previously heated to the temperature of 800° C. or higher to be exposed to the non-oxidizing gas atmosphere, and then heat-treated at the temperature.

Item 20. The method according to any one of items 16 to 19, including step (q-2), wherein, in the step (q-2), the organosilicon compound is exposed under a non-oxidizing gas atmosphere previously heated to a predetermined temperature in a range of 950° C. to 1,500° C., and then heat-treated at the temperature for 1 hour or more.

Item 21. The method according to any one of items 16 to 20, wherein the organosilicon compound is heated in a rotary kiln type, a roller hearth kiln type, a batch kiln type, a pusher kiln type, a mesh belt kiln type, a carbon furnace, a tunnel kiln type, a shuttle kiln type or an elevator kiln type, or in a combination of at least two or more types.

Item 22. The method according to any one of items 16 to 21, wherein the non-oxidizing gas atmosphere is an atmosphere containing an inert gas.

Item 23. The method according to any one of items 16 to 22, wherein the non-oxidizing gas atmosphere is an atmosphere containing a nitrogen gas and/or an argon gas.

Item 24. The method according to any one of items 16 to 23, wherein the organosilicon compound includes polysilsesquioxane represented by formula (II):

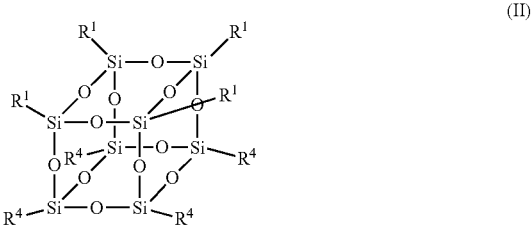

wherein, $R^1$ and $R^4$ are each independently selected from the group of substituted or unsubstituted alkyl having 1 to 45 carbons, substituted or unsubstituted aryl and substituted or unsubstituted arylalkyl, and in the alkyl having 1 to 45 carbons, arbitrary hydrogen may be replaced by halogen, and arbitrary —$CH_2$— may be replaced by —O—, —CH=CH—, cycloalkylene or cycloalkenylene, and in the alkylene in the substituted or unsubstituted arylalkyl, arbitrary hydrogen may be replaced by halogen, and arbitrary —$CH_2$— may be replaced by —O—, —CH=CH—, cycloalkylene or cycloalkenylene.

Item 25. The method according to any one of items 16 to 24, wherein the organosilicon compound includes polysilsesquioxane represented by formula (III):

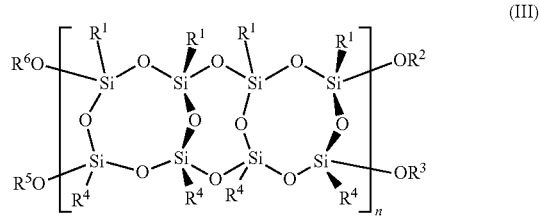

wherein, $R^1$ and $R^4$ are each independently selected from the group of substituted or unsubstituted alkyl having 1 to 45 carbons, substituted or unsubstituted aryl and substituted or unsubstituted arylalkyl, and in the alkyl having 1 to 45 carbons, arbitrary hydrogen may be replaced by halogen, and arbitrary —$CH_2$— may be replaced by —O—, —CH=CH—, cycloalkylene or cycloalkenylene, and in the alkylene in the substituted or unsubstituted arylalkyl, arbitrary hydrogen may be replaced by halogen, and arbitrary —$CH_2$— may be replaced by —O—, —CH=CH—, cycloalkylene or cycloalkenylene, $R^2$, $R^3$, $R^5$ and $R^6$ are each independently selected from the group of a hydrogen atom, substituted or unsubstituted alkyl having 1 to 45 carbons, substituted or unsubstituted aryl and substituted or unsubstituted arylalkyl, and in the alkyl having 1 to 45 carbons, arbitrary hydrogen may be replaced by halogen, and arbitrary —$CH_2$— may be replaced by —O—, —CH=CH—, cycloalkylene, cycloalkenylene or —SiR$^1$$_2$—, and in the alkylene in the substituted or unsubstituted arylalkyl, arbitrary hydrogen may be replaced by halogen, and arbitrary —CH$_2$— may be replaced by —O—, —CH=CH—, cycloalkylene, cycloalkenylene or —SiR$^1$$_2$—, and n represents an integer of 1 or more.

Item 26. The method according to any one of items 16 to 25, wherein the organosilicon compound includes polysilsesquioxane represented by formula (IV):

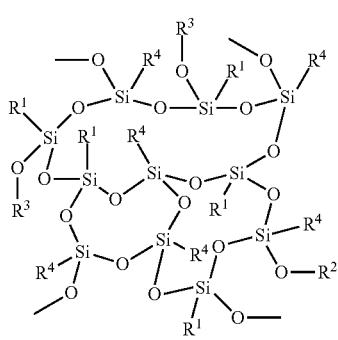

(IV)

wherein, R$^1$ and R$^4$ are each independently selected from the group of substituted or unsubstituted alkyl having 1 to 45 carbons, substituted or unsubstituted aryl and substituted or unsubstituted arylalkyl, and in the alkyl having 1 to 45 carbons, arbitrary hydrogen may be replaced by halogen, and arbitrary —CH$_2$— may be replaced by —O—, —CH=CH—, cycloalkylene or cycloalkenylene, and in the alkylene in the substituted or unsubstituted arylalkyl, arbitrary hydrogen may be replaced by halogen, and arbitrary —CH$_2$— may be replaced by —O—, —CH=CH—, cycloalkylene or cycloalkenylene, R$^2$ and R$^3$ are each independently selected from the group of hydrogen, substituted or unsubstituted alkyl having 1 to 45 carbons, substituted or unsubstituted aryl and substituted or unsubstituted arylalkyl, and in the alkyl having 1 to 45 carbons, arbitrary hydrogen may be replaced by halogen, and arbitrary —CH$_2$— may be replaced by —O—, —CH=CH—, cycloalkylene, cycloalkenylene or —SiR$^1$$_2$—, and in the alkylene in the substituted or unsubstituted arylalkyl, arbitrary hydrogen may be replaced by halogen, and arbitrary —CH$_2$— may be replaced by —O—, —CH=CH—, cycloalkylene, cycloalkenylene or —SiR$^1$$_2$—, and n represents an integer of 1 or more.

Item 27. The method according to any one of items 16 to 26, further including step (p): the organosilicon compound is obtained by causing hydrolysis and polycondensation of a silane compound represented by formula (V):

(V);

wherein, R$^7$, R$^8$ and R$^9$ are each independently hydrogen, halogen, a hydroxyl group or alkyloxy having 1 to 4 carbons, and R$^{10}$ is selected from the group of substituted or unsubstituted alkyl having 1 to 45 carbons, substituted or unsubstituted aryl and substituted or unsubstituted arylalkyl, and in the alkyl having 1 to 45 carbons, arbitrary hydrogen may be replaced by halogen, and arbitrary —CH$_2$— may be replaced by —O—, —CH=CH—, cycloalkylene or cycloalkenylene, and in the alkylene in the substituted or unsubstituted arylalkyl, arbitrary hydrogen may be replaced by halogen, and arbitrary —CH$_2$— may be replaced by —O—, —CH=CH—, cycloalkylene or cycloalkenylene.

Item 28. A method for producing a composition for a negative electrode, including obtaining of the composition for the negative electrode by using the core-shell structure according to any one of items 1 to 10 as a negative electrode active material.

Item 29. A core-shell structure, produced by the method according to any one of items 16 to 27.

Item 30. The core-shell structure according to item 29, being the core-shell structure according to any one of items 1 to 10.

Advantageous Effects of Invention

According to the invention, excellent cycle performance can be achieved while good initial efficiency (initial capacity) is maintained in a secondary battery.

DESCRIPTION OF EMBODIMENTS

Hereinafter, the invention will be described in more detail.
Core-Shell Structure A core-shell structure according to the invention contains the following components (A) and (B) and satisfies the following conditions (i) and (ii):

(A): a core containing at least Si (silicon), O (oxygen) and C (carbon) as a constituent element, and containing crystalline carbon and non-crystalline carbon as a constituent; and (B): a shell encapsulating the core, and including a SiOC structure having a graphene layer;

(i): having an atomic composition represented by formula SiO$_x$C$_y$ (0.5<x<1.8, 1.0<y<5.0); and (ii): having a predetermined value of less than 1.0×10$^5$ Ω·cm in specific resistance determined by powder resistance measurement.

As described above, the core-shell structure according to the invention includes the core (inner core) and the shell (outer shell) encapsulating the core as components (A) and (B) in the order, respectively, as structural features thereof.

Here, a term "encapsulating" means a structure in which the shell surrounds the core, which is sufficient if the structure in which a surface of the core is partially covered with the shell is formed. More specifically, the term "encapsulating" also means the structure in a case where the surface of the core is completely covered with the shell, and also a case where a part of the surface of the core not covered with the shell is exposed to an outside.

Such a core-shell structure in the invention can be confirmed by observation using a scanning electron microscope (SEM), for example.

Figure 2:
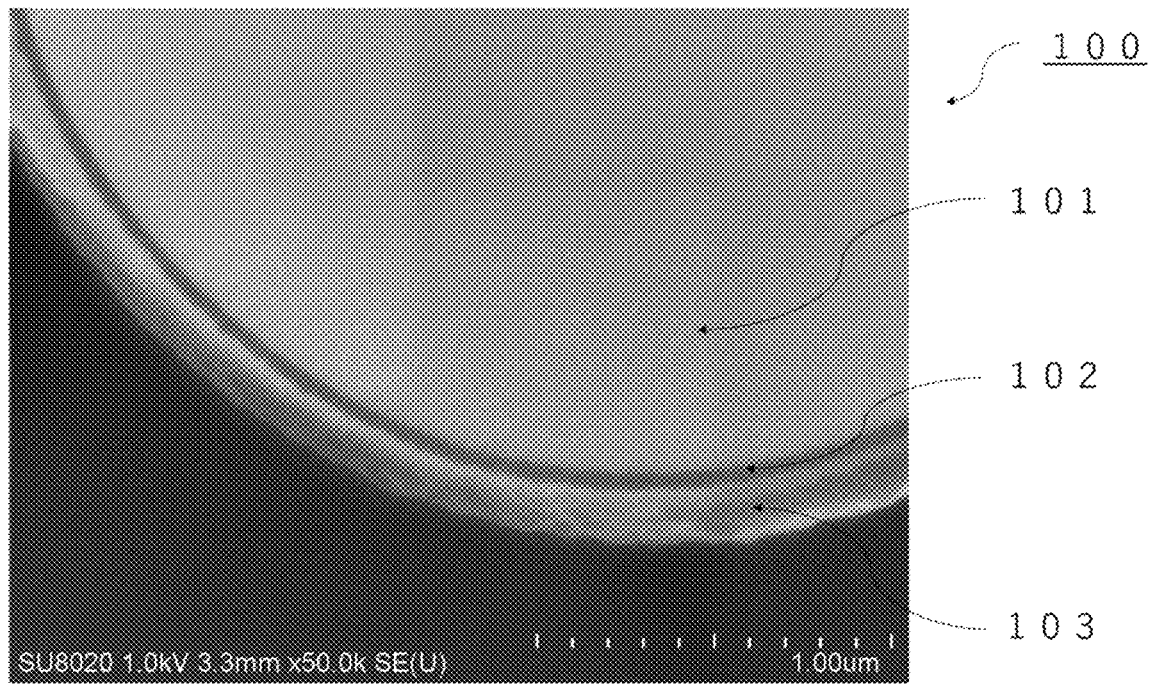
FIG. 2 is a diagram showing each site provided for Auger electron spectroscopy (AES) analysis in a SEM image of a cross section of the core-shell particle obtained in Example 1.

In this regard, as a specific form in which the shell encapsulates the core, a structure as shown in a SEM image in FIG. 2 is shown as an example. In the structure shown in FIG. 2, the shell includes an intermediate layer covering a surface of a core, and a surface layer existing on an outer surface of the intermediate layer as a main component, and as described below, the core, the intermediate layer and the surface layer are characterized by a difference in an atomic composition by Si, O and C and a component. In the invention, such a core-shell structure formed of the core and the shell including the intermediate layer and the surface layer is a preferred embodiment.

In addition, in the invention, the core-shell structure is preferably substantially spherical particles having a particle size of a nanometer or micrometer scale, and in this case, more specifically, the particle size of the substantially spherical particles may be in the range of about 1 nanometer to about 990 micrometers, and is preferably in the range of about 10 nanometers to about 600 micrometers, and when necessary, maybe in the range of about 50 nanometers to about 500 micrometers or about 100 nanometers to about 400 micrometers. The term "substantially spherical" refers to substantially equiaxed particles with rounded shapes that are non-faceted or substantially free of sharp corners, and the morphology of the core-shell structure according to the invention may be an ellipsoid, or may be a sphere, prolate spheroid, or oblate spheroid. Furthermore, when the core-shell structure according to the invention is utilized as a negative electrode active material, in consideration of the range of thickness of a practical electrode in about 10 micrometers to 100 micrometers, the particle size of the core-shell structure is further preferably in the range of about 100 nanometers to about 50 micrometers, and still further preferably in the range of about 500 nanometers to about 10 micrometers. Here, the shape or the particle size of the core-shell structure is confirmed or measured by observation using SEM.

Furthermore, in the invention, the core and the shell are preferably chemically bonded.

More specifically, for example, the core-shell structure of the invention can be directly obtained by heat treating various polysilsesquioxanes at a predetermined heating rate as described below. In this case, the core and the shell are also directly formed by heat treatment of polysilsesquioxane, and therefore the core-shell structure is obtained in a state in which the core and the shell are connected by a predetermined chemical skeleton derived from polysilsesquioxane. Specific examples of such a chemical skeleton include a chemical skeleton including Si—O—C, C—C, Si—O and Si—O—Si.

In this regard, the core-shell structure of the invention has an elemental ratio represented by $SiO_xC_y$ (0.5<x<1.8, 1.0<y<5.0). If x is in the range of 0.5 to 1.8, an amorphous silicon oxide component in which a nanodomain structure is formed is produced, and sufficient cell capacity can be obtained. A value of y is adjusted to 1.0 to 5.0, and is not particularly limited, but may be adjusted to about 1.0 to about 4.0 or about 1.0 to about 3.0, for example. However, the structure of the invention has one of features in which the graphene layer is developed, and in consideration of the matter, a numerical value range of y is not essential conditions.

Both the core and the shell in the invention are common in containing Si (silicon), O (oxygen) and C (carbon) as the constituent element.

However, the core and the shell have a difference in the component formed of carbon (C) contained in the components. More specifically, while the core is characterized by containing the crystalline carbon and the non-crystalline carbon as the constituent, the shell is characterized by containing the SiOC structure having the graphene layer as the constituent.

In the core-shell structure according to the invention, a graphene layer structure is formed in a shell part, and therefore the core-shell structure exhibits predetermined features in powder resistance measurement and Raman spectroscopy.

More specifically, the core-shell structure according to the invention is required to have a predetermined value of less than $1.0 \times 10^5$ Ω·cm in the specific resistance determined in powder resistance measurement. Further, the specific resistance is preferably about $1.0 \times 10^4$ Ω·cm or less, further preferably about $1.0 \times 10^3$ Ω·cm or less, still further preferably about $1.0 \times 10^2$ Ω·cm or less, and still further preferably about 1.0 Ω·cm or less. If the specific resistance determined in the powder resistance measurement takes such a value, the core-shell structure holds conductivity preferred as a negative electrode material.

In addition thereto, a lower limit of the specific resistance is not particularly limited because excellent conductivity can be further achieved as the specific resistance is lower. In consideration of the specific resistance of various graphene materials, the lower limit of the specific resistance of the core-shell structure according to the invention can be adjusted to $1.0 \times 10^{-3}$ Ω·cm or more, for example. In addition, in the invention, a numerical value range obtained by combining arbitrary values of the upper limits and the lower limits as described above can be adopted, and a numerical value range of the specific resistance is clearly disclosed in the present specification in the form of an embodiment.

Further, a measurement method for powder resistance is not particularly limited, and various techniques known to those skilled in the art can be adopted. For example, the powder resistance can also be measured by using a commercially available powder resistance measurement device such as Powder Resistivity Measurement System MCP-PD51, Low Resistivity Meter Loresta-GP, High Performance Resistivity Meter Hiresta-UX, made by Mitsubishi Chemical Analytech Co., Ltd.

Figure 4:
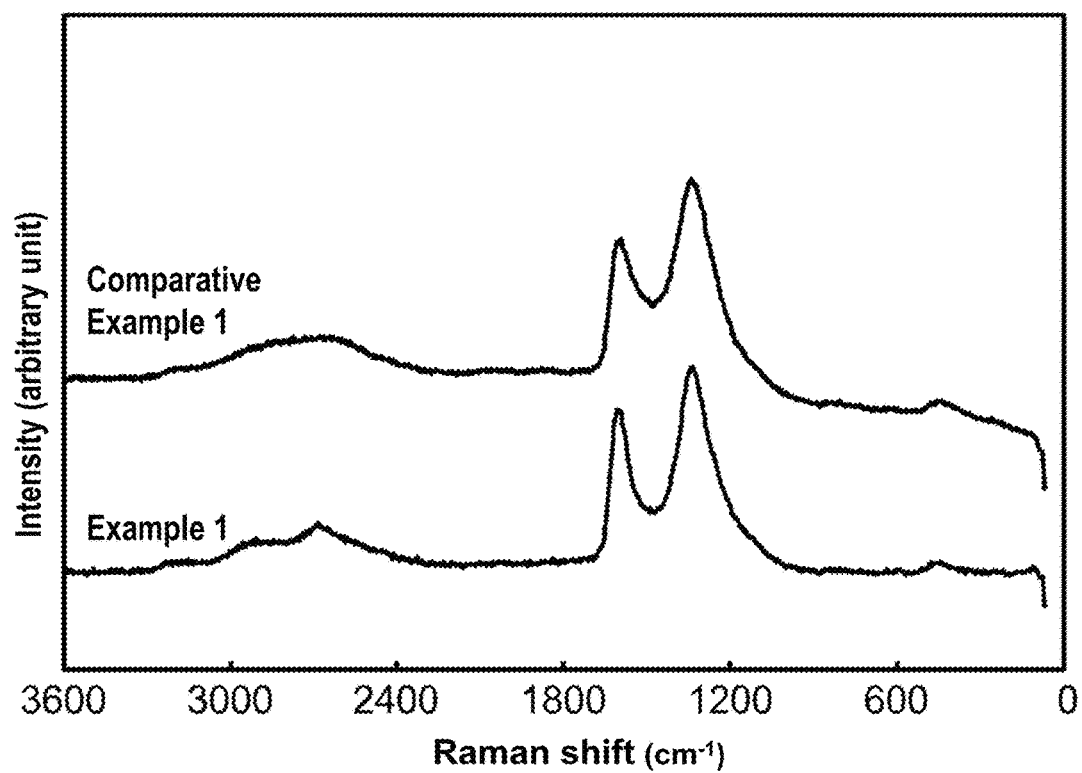
FIG. 4 is a diagram showing a Raman spectroscopy spectrum obtained on the core-shell particles obtained in Example 1 and the SiOC particles obtained in Comparative Example 1.
Figure 5:
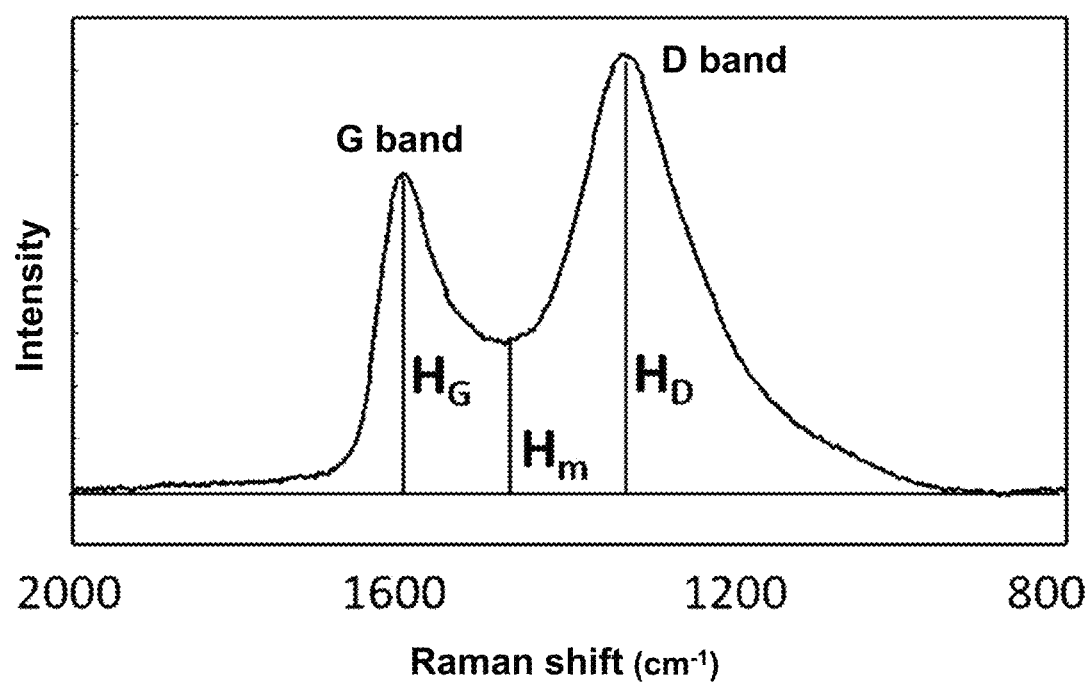
FIG. 5 is a diagram explaining an intensity ratio adopted as a parameter in a Raman spectroscopy spectrum.

Further, as shown in FIGS. 4 and 5, if the core-shell structure of the invention is measured by Raman spectroscopy, in a spectrum obtained, scattering is recognized in the vicinity of 1,590 cm$^{-1}$ (G band or the graphene layer) and in the vicinity of 1,325 cm$^{-1}$ (D band or the non-crystalline carbon).

Here, intensity (peak height) of the G band is taken as $H_G$, and intensity (peak height) of the D band is taken as $H_D$. Further, as shown in FIG. 5, a minimum point between the G band and the D band is taken as an m point, and intensity at the m point is taken as $H_m$.

As an intensity ratio $H_G/H_m$ is larger, the graphene layer is further grown. In this regard, in the core-shell structure of the invention, the intensity ratio $H_G/H_m$ in a Raman spectrum has a predetermined value of preferably about 1.80 or more, further preferably about 1.85 or more or about 1.90 or more, still further preferably about 2.00 or more, about 2.10 or more or about 2.20 or more, particularly preferably about 2.30 or more or about 2.40 or more, and most preferably about 2.50 or more, about 2.53 or more, about 2.55 or more, about 2.58 or more, about 2.60 or more or about 2.70 or more, and when necessary, about 2.75 or more, about 2.76 or more, about 2.78 or more, about 2.80 or more, about 2.81 or more, about 2.82 or more, about 2.83 or more, about 2.84 or more, about 2.85 or more, about 2.86 or more, about 2.87 or more, about 2.88 or more, about 2.89 or more or about 2.90 or more. If the intensity ratio $H_G/H_m$ has such a value, the graphene layer structure is developed in the shell part.

In addition, an upper limit of the intensity ratio $H_G/H_m$ is not particularly limited, and is about 7.00 or less, about 6.00 or less or about 5.00 or less, and when necessary, about 4.00 or less, about 4.50 or less or about 3.00 or less, for example, and a numerical value range obtained by combining the upper limits with an arbitrary value of the lower limits can be adopted, and the numerical value range of the intensity ratios $H_G/H_m$ is clearly disclosed in the present specification in the form of the embodiment.

Further, in the core-shell structure of the invention, a ratio (peak height ratio $H_D/H_G$) of the peak height ($H_G$) in the G band to the peak height ($H_D$) in the D band is preferably less than about 1.50. As described above, the D band suggests existence of the non-crystalline carbon, and the G band suggests existence of the graphene layer. Therefore, a smaller degree of the peak height ratio $H_D/H_G$ means existence of a richer amount of the graphene layer. More specifically, in the core-shell structure of the invention, if the intensity ratio $H_G/H_m$ in the Raman spectrum is about 1.80 or more and the peak height ratio $H_D/H_G$ is less than about 1.50, a sufficient amount of the graphene layer structure exists, and predetermined advantageous effects of the invention can be reliably obtained. The peak height ratio $H_D/H_G$ is preferably about 1.49 or less, further preferably about 1.48 or less or about 1.45 or less, still further preferably about 1.42 or less, particularly preferably about 1.40 or less, and when necessary, about 1.38 or less, about 1.35 or less, about 1.32 or less or about 1.30 or less.

In addition, a lower limit of the peak height ratio $H_D/H_G$ is not particularly limited, but is about 0.30 or more, about 0.40 or more, about 0.50 or more or about 0.60 or more, and when necessary, about 0.70 or more or about 0.80 or more, for example. In addition thereto, a numerical value range obtained by combining the lower limits with an arbitrary value of the upper limits can be adopted, and the numerical value range of the peak height ratio $H_D/H_G$ is clearly disclosed in the present specification in the form of the embodiment.

Further, a mole ratio of free carbon in the core-shell structure of the invention is preferably about 1.10 or more, further preferably about 1.15 or more, still further preferably about 1.18 or more, particularly preferably about 1.20 or more, and when necessary, about 1.25 or more.

In addition, a calculation method for the mole ratio of free carbon is as described in Examples below. In addition thereto, the mole ratio of free carbon is naturally determined in a SiOC mole ratio obtained by elemental composition analysis, and therefore an upper limit thereof is not particularly limited, but is about 2.5 at the highest.

Further, in a specific embodiment, when elemental analysis is conducted on the core and the shell, respectively, a mole ratio of a content ratio (mol %) of carbon (C) to a content ratio (mol %) of silicon (Si) in the components described above preferably satisfies the following relationship:

(C/Si molar ratio in the core)<(C/Si molar ratio in the shell).

Further, in the specific embodiment, as described above, the shell includes the intermediate layer covering the surface of the core, and the surface layer existing in the outer surface of the intermediate layer. In this case, the core, the intermediate layer and the surface layer preferably satisfy the following relationship:

(C/Si molar ratio in the core)<(C/Si molar ratio in the surface layer)<(C/Si molar ratio in the intermediate layer).

In addition thereto, the core, the intermediate layer and the surface layer satisfy the relationship described above, and also preferably satisfy the following conditions (a) and (b):

condition (a): the C/Si molar ratio in the core is about 5.0 or less (for example, about 0.5 to about 5.0); and condition (b): the C/Si molar ratio in the intermediate layer and the surface layer is about 8.0 or more (for example, about 8.0 to about 20.0).

When the core-shell structure satisfying the conditions described above is used as the negative electrode active material for a secondary battery, charging and discharge rate characteristics and cycle performance can be improved with good reliability in the secondary battery.

Further, an elemental component ratio "C:O:Si" (mole ratio) in the core is preferably about 1.0 to about 5.0:about 0.5 to about 1.8:1.0, further preferably about 1.0 to about 4.5:about 0.5 to about 1.8:1.0, and still further preferably about 1.0 to about 4.0:about 0.5 to about 1.8:1.0.

Furthermore, the elemental component ratio "C:O:Si" (mole ratio) in the intermediate layer is preferably about 10.0 to about 20.0:about 0.5 to about 1.8:1.0, further preferably about 11.0 to about 18.0:about 0.5 to about 1.8:1.0, still further preferably about 12.0 to about 16.0:about 0.5 to about 1.8:1.0, particularly further preferably about 13.0 to about 16.0:about 0.5 to about 1.8:1.0, and when necessary, about 14.0 to about 16.0:about 0.5 to about 1.8: 1.0.

Furthermore, the elemental component ratio "C:O:Si" (mole ratio) in the surface layer is preferably about 8.0 to about 18.0:about 0.5 to about 1.8:1.0, further preferably about 9.0 to about 16.0:about 0.5 to about 1.8:1.0, still further preferably about 10.0 to about 15.0:about 0.5 to about 1.8:1.0, particularly preferably about 11.0 to about 14.0:about 0.5 to about 1.8:1.0, and when necessary, about 11.0 to about 13.0:about 0.5 to about 1.8:1.0.

In addition, the elemental component ratio in the core-shell structure of the invention or in the core and shell (the intermediate layer or the surface layer) serving as the components thereof only needs to be obtained by using various measurement technologies, and is not particularly limited. For example, Auger electron spectroscopy (AES), XPS analysis or SIMS analysis being combined with ion etching can be used.

Furthermore, when the surface is analyzed by X-ray photoelectron spectroscopy (XPS) in the core-shell structure of the invention, a carbon ratio is high as shown also in FIG. 6A and FIG. 6B or Examples in Table 3 described below, and further a C1s main peak in an XPS spectrum is comparatively sharp. Sharpness of the C1s main peak in the XPS spectrum, and capability of confirming a sub-peak structure (shake-up peak) at 291 eV suggest existence of the crystalline carbon, and supports development of the graphene layer structure. Accordingly, the shell in the core-shell structure of the invention has features of including the SiOC structure having the graphene layer.

When the surface layer is analyzed by the X-ray photoelectron spectroscopy (XPS) in the core-shell structure of the invention, an elemental composition ratio of C:O:Si (unit: atom %) is preferably about 50.0 to about 98.0:about 1.0 to about 25.0:about 1.0 to about 25.0, further preferably about 60.0 to about 98.0:about 1.0 to about 20.0:about 1.0 to about 20.0, still further preferably about 70.0 to about 98.0:about 1.0 to about 15.0:about 1.0 to about 15.0, particularly preferably about 80.0 to about 98.0:about 1.0 to about 10.0:about 1.0 to about 10.0, and when necessary, about 84.0 to about 98.0:about 1.0 to about 8.0:about 1.0 to about 8.0, about 86.0 to about 98.0:about 1.0 to about 12.0:about 1.0 to about 12.0, about 88.0 to about 98.0:about 1.0 to about 6.0:about 1.0 to about 6.0 or about 90.0 to about 98.0:about 1.0 to about 5.0:about 1.0 to about 5.0.

In the core-shell structure of the invention, if the elemental composition ratio of C:O:Si (unit: atom %) in the XPS spectrum is in the range described above, the shell (surface layer) in which the graphene layer is developed at a higher level can be achieved. According to core-shell structure encapsulating the core formed by including graphite carbon containing the crystalline carbon and the non-crystalline carbon within such a shell, when the core-shell structure is used as the negative electrode active material for the secondary battery, good charging and discharging rate characteristics and cycle performance can be achieved in the secondary battery produced.

Production Method for Core-Shell Structure

Specifically, the core-shell structure of the invention can be obtained by rapidly heating an organosilicon compound having a polysilsesquioxane structure represented by formula (I) to a predetermined temperature under an inert atmosphere and then by heat treating the resulting material at the temperature for 1 hour or more. More specifically, a method for producing the core-shell structure according to the invention includes the following step (q-1) or (q-2):

step (q-1): the organosilicon compound having the polysilsesquioxane structure represented by formula (I) is heated to a temperature of 800° C. or higher at a heating rate of 100° C. per minute or more under the non-oxidizing gas atmosphere, and then heat-treated at the temperature for 1 hour or more; and step (q-2): the organosilicon compound having the polysilsesquioxane structure represented by formula (I) is exposed to the non-oxidizing gas atmosphere previously heated to the temperature of 800° C. or higher, and then heat-treated at the temperature for 1 hour or more.

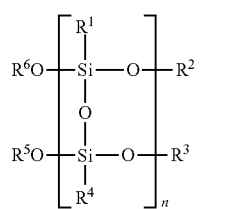

(I)

In the formula, $R^1$ and $R^4$ are each independently selected from the group of substituted or unsubstituted alkyl having 1 to 45 carbons, substituted or unsubstituted aryl and substituted or unsubstituted arylalkyl, and in the alkyl having 1 to 45 carbons, arbitrary hydrogen may be replaced by halogen, and arbitrary —$CH_2$— may be replaced by —O—, —CH=CH—, cycloalkylene or cycloalkenylene, and in the alkylene in the substituted or unsubstituted arylalkyl, arbitrary hydrogen may be replaced by halogen, and arbitrary —$CH_2$— may be replaced by —O—, —CH=CH— or cycloalkylene, $R^2$, $R^3$, $R^5$ and $R^6$ are each independently selected from the group of a hydrogen atom, substituted or unsubstituted alkyl having 1 to 45 carbons, substituted or unsubstituted aryl and substituted or unsubstituted arylalkyl, and in the alkyl having 1 to 45 carbons, arbitrary hydrogen may be replaced by halogen, and arbitrary —$CH_2$— may be replaced by —O—, —CH=CH—, cycloalkylene, cycloalkenylene or —$SiR^1_2$—, and in the alkylene in the substituted or unsubstituted arylalkyl, arbitrary hydrogen may be replaced by halogen, and arbitrary —$CH_2$— may be replaced by —O—, —CH=CH—, cycloalkylene, cycloalkenylene or —$SiR^1_2$—, and n represents an integer of 1 or more.

In the invention, a term "halogen" is literally understood and represents fluorine, chlorine, bromine, iodine and so forth, and above all, fluorine or chlorine is preferred.

More specifically, as the organosilicon compound, polysilsesquioxane having at least one structure selected from the group of chemical formulas (II), (III) and (IV) and a complex structure thereof can be adopted. If the polysilsesquioxane is rapidly heated in step (q-1) or (q-2), and heat-treated for a predetermined time, the polysilsesquioxane is converted into the core-shell structure as described above.

Hereinafter, specific example of polysilsesquioxane that can be adopted in the invention will be described.

First, polysilsesquioxane represented by formula (II) is cage-type polysilsesquioxane.

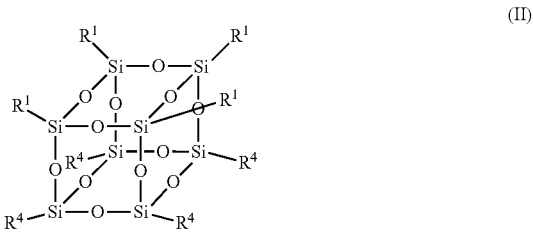

(II)

In the formula, $R^1$ and $R^4$ are each independently selected from the group of substituted or unsubstituted alkyl having 1 to 45 carbons, substituted or unsubstituted aryl and substituted or unsubstituted arylalkyl, and in the alkyl having 1 to 45 carbons, arbitrary hydrogen may be replaced by halogen, and arbitrary —$CH_2$— may be replaced by —O—, —CH=CH—, cycloalkylene or cycloalkenylene, and in the alkylene in the substituted or unsubstituted arylalkyl group, arbitrary hydrogen may be replaced by halogen, and arbitrary —$CH_2$— may be replaced by —O—, —CH=CH—, cycloalkylene or cycloalkenylene.

Further, preferred examples of the cage-type polysilsesquioxane represented by formula (II) include compounds represented by formulas (V) to (X).

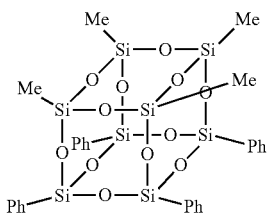
(V)

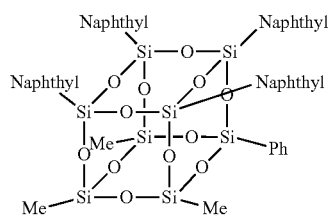
(VI)

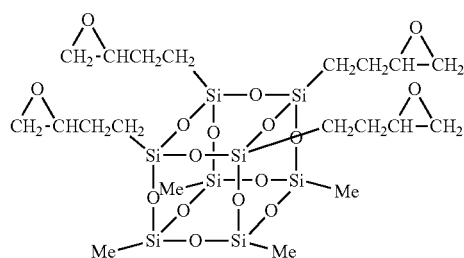
(VII)

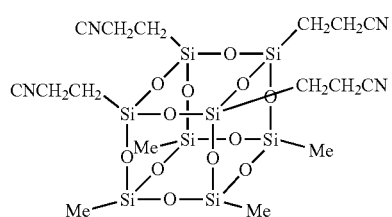
(VIII)

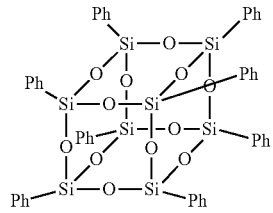
(IX)

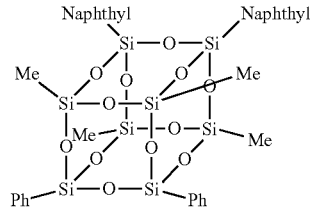
(X)

Here, in the formulas, "Me" represents a methyl group, "Ph" represents a phenyl group, and Naphthyl represents a naphthyl group.

Further, a compound represented by formula (III) is ladder-type polysilsesquioxane.

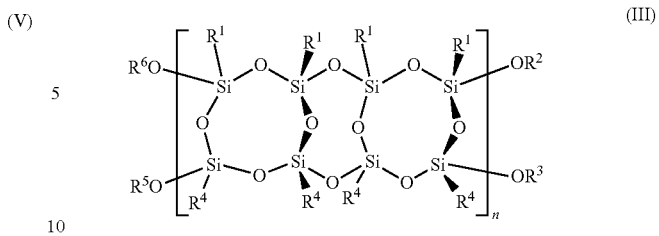
(III)

In the formula, $R^1$ and $R^4$ are each independently selected from the group of substituted or unsubstituted alkyl having 1 to 45 carbons, substituted or unsubstituted aryl and substituted or unsubstituted arylalkyl, and in the alkyl having 1 to 45 carbons, arbitrary hydrogen may be replaced by halogen, and arbitrary —CH$_2$— may be replaced by —O—, —CH=CH—, cycloalkylene or cycloalkenylene, and in the alkylene in the substituted or unsubstituted arylalkyl, arbitrary hydrogen may be replaced by halogen, and arbitrary —CH$_2$— may be replaced by —O—, —CH=CH—, cycloalkylene or cycloalkenylene, $R^2$, $R^3$, $R^5$ and $R^6$ are each independently selected from the group of hydrogen, substituted or unsubstituted alkyl having 1 to 45 carbons, substituted or unsubstituted aryl and substituted or unsubstituted arylalkyl, and in the alkyl having 1 to 45 carbons, arbitrary hydrogen may be replaced by halogen, and arbitrary —CH$_2$— may be replaced by —O—, —CH=CH—, cycloalkylene, cycloalkenylene or —SiR$^1{}_2$—, and in the alkylene in the substituted or unsubstituted arylalkyl, arbitrary hydrogen may be replaced by halogen, and arbitrary —CH$_2$— may be replaced by —O—, —CH=CH—, cycloalkylene, cycloalkenylene or —SiR$^1{}_2$—, and n represents an integer of 1 or more.

Specific examples of the ladder-type polysilsesquioxane represented by formula (III) include the compound described in each of WO 2003/024870 A and WO 2004/081084 A, and can be used without any limitation as long as the core-shell structure of the invention can be produced therefrom.

Hereinafter, as specific examples of preferred ladder-type polysilsesquioxane, compounds represented by formulas (XI) to (XIII) will be described below.

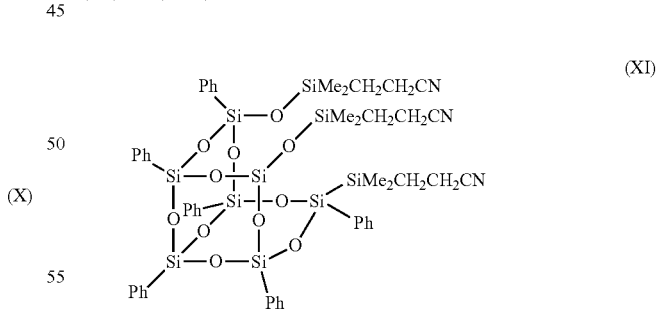
(XI)

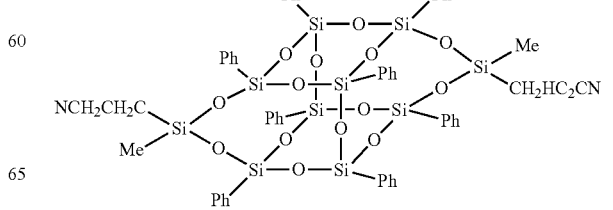
(XII)

-continued

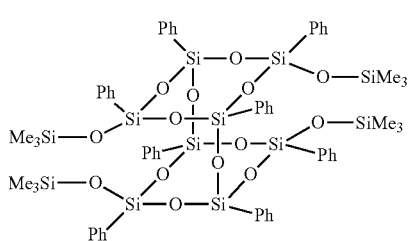

(XIII)

Here, in the formulas, "Me" represents a methyl group, and "Ph" represents a phenyl group.

A compound represented by formula (IV) is random structure-type polysilsesquioxane.

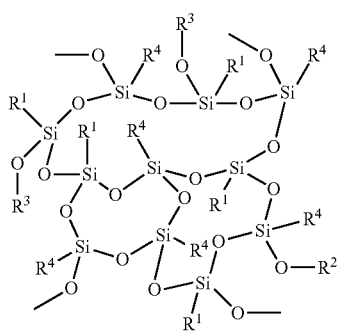

(IV)

In the formula, $R^1$ and $R^4$ are each independently selected from the group of substituted or unsubstituted alkyl having 1 to 45 carbons, substituted or unsubstituted aryl and substituted or unsubstituted arylalkyl, and in the alkyl having 1 to 45 carbons, arbitrary hydrogen may be replaced by halogen, and arbitrary —$CH_2$— may be replaced by —O—, —CH=CH—, cycloalkylene or cycloalkenylene, and in the alkylene in the substituted or unsubstituted arylalkyl, arbitrary hydrogen may be replaced by halogen, and arbitrary —$CH_2$— may be replaced by —O—, —CH=CH—, cycloalkylene or cycloalkenylene, $R^2$ and $R^3$ are each independently selected from the group of hydrogen, substituted or unsubstituted alkyl having 1 to 45 carbons, substituted or unsubstituted aryl and substituted or unsubstituted arylalkyl, and in the alkyl having 1 to 45 carbons, arbitrary hydrogen may be replaced by halogen, and arbitrary —$CH_2$— may be replaced by —O—, —CH=CH—, cycloalkylene, cycloalkenylene or —$SiR^1_2$—, and in the alkylene in the substituted or unsubstituted arylalkyl, arbitrary hydrogen may be replaced by halogen, and arbitrary —$CH_2$— may be replaced by —O—, —CH=CH—, cycloalkylene, cycloalkenylene or —$SiR^1_2$—, and n represents an integer of 1 or more.

In addition, in formulas (II), (III) and (IV), $R^1$ and $R^4$ are each independently selected from the group of substituted or unsubstituted alkyl having 1 to 45 carbons, substituted or unsubstituted aryl and substituted or unsubstituted arylalkyl. More specifically, $R^1$ and $R^4$ are each independently preferably an aromatic group such as a phenyl group and a naphthyl group, halogen or an alkyl group having 1 to 5 carbons, and further preferably an aromatic group such as a phenyl group and a naphthyl group.

As described above, as heat treatment conditions in an aspect of step (q-1), polysilsesquioxane is required to be heated to the temperature of 800° C. or higher at the heating rate of 100° C. per minute or more under a predetermined non-oxidizing atmosphere, and then heat-treated at the temperature for 1 hour or more.

As described above, if polysilsesquioxane serving as a raw material is rapidly heated at the heating rate of 100° C. per minute or more, an elimination amount of a chemical group such as a —Si-phenyl group and a —Si-methyl group or hydrogen ($H_2$) is estimated to be increased in a shell-production portion (surface layer portion) of the polysilsesquioxane, resulting in formation of the graphene layer structure.

More specifically, for the purpose of producing a predetermined core-shell structure in the core-shell structure of the invention, the heating rate is adjusted to 100° C. per minute or more in step (q-1). The heating rate is not particularly limited as long as the heating rate is 100° C. per minute or more, and from a viewpoint of forming the graphene layer structure in the shell with sufficient reliability, the heating rate is preferably about 100° C. to about 1,000° C. per minute, further preferably about 200° C. to about 1,000° C. per minute, still further preferably about 300° C. to about 1,000° C. per minute, and when necessary, about 100° C. to about 900° C. per minute, about 200° C. to about 900° C. per minute, about 300° C. to about 800° C. per minute or about 400° C. to about 600° C. per minute.

In the invention, rapid heating may be performed in the aspect of step (q-1), but an aspect of step (q-2) in which the predetermined core-shell structure of the invention can be produced can also be adopted.

More specifically, in the aspect of step (q-2), the organosilicon compound is exposed to the non-oxidizing gas atmosphere previously heated to the temperature of 800° C. or higher, and then heat-treated at the temperature for 1 hour or more. The organosilicon compound serving as the raw material is directly exposed to the non-oxidizing gas atmosphere previously heated to the temperature of 800° C. or higher, and therefore the organosilicon compound is rapidly heated to the temperature, and the core-shell structure in which the graphene layer structure is developed in the shell part is formed.

Further, in order to promote sufficient production of the predetermined core-shell structure of the invention and the graphene layer in the shell (surface layer), a temperature at which polysilsesquioxane is rapidly heated and heat-treated in step (q-1) or (q-2) is preferably about 1,000° C. or higher. The temperature is not particularly limited as long as the core-shell structure of the invention is produced. For example, the range of the temperature is about 800° C. to about 2500° C., preferably about 1,000° C. to about 2,000° C., further preferably about 1,000° C. to about 1,600° C., particularly preferably about 1,000° C. to about 1,500° C., and most preferably about 1,000° C. to about 1,400° C.

In addition thereto, when the aspect of step (q-2) is adopted, more specifically, for example, the organosilicon compound may be moved from an environment of about 600° C. or lower, preferably about 550° C. or lower, further preferably about 500° C. or lower, still further preferably about 450° C. or lower, and when necessary, about 400° C. or lower, about 350° C. or lower or about 300° C. or lower to the non-oxidizing gas atmosphere previously heated to the temperature of 800° C. or higher to be exposed to the non-oxidizing gas atmosphere, and heat-treated. A specific aspect in which the organosilicon compound is moved from the environment at the predetermined temperature to the non-oxidizing gas atmosphere previously heated to the temperature of 800° C. or higher is not particularly limited, and includes the aspect of inputting the organosilicon compound into the heating furnace by using a raw material feeding means such as the raw material feeder as described below.

Further, a heat treating time is not particularly limited as long as the heat treating time is 1 hour or more, but is ordinarily about 1 to about 30 hours, preferably about 1 to about 24 hours, further preferably about 1 to about 16 hours, and when necessary, about 1 to about 12 hours, about 1 to about 10 hours, about 1 to about 8 hours, about 1 to about 7 hours or about 1 to about 6 hours. The heat treating time only needs to be appropriately determined according to properties of the polysilsesquioxane used as the raw material, specificity of a shape of the core-shell structure produced, the graphene layer in the shell (surface layer) or the like. Further from a viewpoint of production efficiency, a minimum heat treating time in which a desired core-shell structure can be obtained only needs to be adopted. In addition, the same statement is applied to the heating or heat treatment temperature described above.

In addition, the "non-oxidizing gas atmosphere" in the invention involves an inert gas atmosphere, a reducing atmosphere and a mixed atmosphere formed by combining the atmospheres. Specific examples of the inert gas atmosphere include an atmosphere of an inert gas such as nitrogen, argon and helium, and the inert gases may be used alone in one kind, or in combination of two or more kinds. In addition thereto, as the inert gas, the inert gas generally used is sufficient, but preferably the inert gas with a high-purity specification. The reducing atmosphere involves an atmosphere containing a reducing gas such as hydrogen. Specific examples thereof include a mixed gas atmosphere of 2% by volume or more of a hydrogen gas and an inert gas. In addition thereto, as the reducing atmosphere, a hydrogen gas atmosphere itself may be used, when necessary.

In addition thereto, an environment of the non-oxidizing atmosphere can be created by replacing the atmosphere within a heat treatment furnace by the predetermined gas described above or feeding the predetermined gas into the furnace.

When the predetermined gas is fed into the heat treatment furnace, a gas flow rate thereof only needs to be appropriately adjusted within a proper range according to a specification of the heat treatment furnace to be adopted (for example, a shape and a size of the furnace), and is not particularly limited, and can be adjusted to about 5 to about 100% of a furnace volume per minute, and preferably about 5 to about 30% per minute. More specifically, when a rotary kiln furnace having about 40 L in the furnace volume is used, the gas flow rate (purge amount) can be adjusted to about 10 to about 15 L per minute, for example.

Specific examples of the heat treatment furnace that may be adopted for heat treatment in step (q-1) or (q-2) include various heat treatment furnaces of a rotary kiln type, a roller hearth kiln type, a batch kiln type, a pusher kiln type, a mesh belt kiln type, a carbon furnace, a tunnel kiln type, a shuttle kiln type or an elevator kiln type. In the heat treatment furnaces, only one kind may be used, or two or more kinds may be combined. In addition, when two or more kinds are combined, each heat treatment furnace may be connected in series or in parallel.

Furthermore, a high-speed heating furnace according to which an exact heating rate can be controlled may be used, and specific examples of such a high-speed heating furnace include Ultra High Temperature Vacuum. Furnaces With Graphite Heater NM-30G Series (model NM 8X20-30G, NM 15X20-30G; made by NEMS Co., Ltd.), ULTRA HIGH SPEED HEATING ELECTRIC FURNACE FUB Series (model FUB712PB, FUB722PB, FUB732PB; made by Toyo Engineering Works, Ltd.), and an ultra-high speed heating electric furnace FUS Series (model FUS612PB, FUS622PB, FUS632PB; made by Asahi Rika Seisakujyo).

In the heat treatment furnace as described above, according to the aspect of step (q-1), the predetermined organosilicon compound may be heat-treated by controlling heating at a predetermined heating rate, and/or according to the aspect of step (q-2), the organosilicon compound may be exposed to the non-oxidizing atmosphere within the heat treatment furnace previously heated to the predetermined temperature. In particular, in the case of the aspect of step (q-2), specifically, a heat treatment furnace having a raw material feeding device such as the raw material feeder is adopted, and the organosilicon compound serving as the raw material is input into the heat treatment furnace previously heated to the predetermined temperature by using the feeder to allow rapid heating of the organosilicon compound. In a heating furnace such as a rotary kiln, a configuration in which various raw material feeders such as a vibratory feeder and a conveyor feeder (for example, a belt conveyor type, a screw conveyor type) are adopted is well known in the technical field, and the raw material feeders of a driving system can be adopted.

Now, polysilsesquioxane to be heat-treated in step (q-1) or (q-2) can be obtained by causing hydrolysis and polycondensation of a silane compound represented by formula (V) under an acidic catalyst.

$$R^{10}Si(R^7)(R^8)(R^9) \qquad (V).$$

In the formula, $R^7$, $R^8$ and $R^9$ are each independently hydrogen, halogen, a hydroxyl group or alkyloxy having 1 to 4 carbons, and $R^{10}$ is selected from the group of substituted or unsubstituted alkyl having 1 to 45 carbons, substituted or unsubstituted aryl and substituted or unsubstituted arylalkyl, and in the alkyl having 1 to 45 carbons, arbitrary hydrogen may be replaced by halogen, and arbitrary —CH$_2$— may be replaced by —O—, —CH=CH—, cycloalkylene or cycloalkenylene, and in the alkylene in the substituted or unsubstituted arylalkyl, arbitrary hydrogen may be replaced by halogen, and arbitrary —CH$_2$— maybe replaced by —O—, —CH=CH—, cycloalkylene or cycloalkenylene.

In formula (V), a substituent of the substituted alkyl group is preferably halogen, alkyl having 1 to 10 carbons, alkenyl having 2 to 10 carbons, alkoxy having 1 to 5 carbons, and an aromatic group such as phenyl and naphthyl.

Examples of the silane compound represented by formula (V) mainly include organotrichlorosilanes or organotrialkoxysilanes. Specific examples thereof include substituted or unsubstituted alkyltrialkoxysilane compounds such as methyltrimethoxysilane, methyltriethoxysilane, ethyltrimethoxysilane, ethyltriethoxysilane, n-propyltrimethoxysilane, n-butyltriethoxysilane, isobutyltrimethoxysilane, n-pentyltriethoxysilane, n-hexyltrimethoxysilane, isooctyltriethoxysilane, decyltrimethoxysilane, methyldimethoxyethoxysilane, methyldiethoxymethoxysilane, 2-chloroethyltriethoxysilane, methoxymethyltriethoxysilane, methylthiomethyltriethoxysilane, methoxycarbonylmethyltriethoxysilane, 2-acryloyloxyethyltrimethoxysilane and 3-methacryloyloxypropyltriethoxysilane; and substituted or unsubstituted aryltrialkoxysilane compounds such as phenyltrimethoxysilane, 4-methoxyphenyltrimethoxysilane, 2-chlorophenyltrimethoxysilane, phenyltriethoxysilane, 2-methoxyphenyltriethoxysilane, phenyldimethoxyethoxysilane and phenyldiethoxymethoxysilane.

Polysilsesquioxane obtained by hydrolysis and polycondensation of such a silane compound may be provided as the raw material for heat treatment in step (q-1) or (q-2) by obtaining a commercial item, a custom-made item or the like in advance, but desired polysilsesquioxane may be appropriately synthesized on their own and used.

More specifically, the production method according to the invention may further include step (p) described below before step (q-1) or (q-2).

The production method may further include step (p): the organosilicon compound is obtained by causing hydrolysis and polycondensation of the silane compound represented by formula (V).

Hereinafter, conditions of hydrolysis and polycondensation of the silane compound in step (p) will be described.

Solvent

A solvent forming a reaction mixture in step (p) is not particularly limited as long as the solvent allows to progress hydrolysis and polycondensation of the silane compound. Specifically, the solvent may include water in order to assist hydrolysis of the silane compound, and specific examples include water, and also an organic solvent including alcohols such as methanol, ethanol and 2-propanol, ethers such as diethyl ether, ketones such as acetone and methyl ethyl ketone, hexane, DMF and an aromatic hydrocarbon solvent such as toluene. The solvents may be used alone in one kind, or in mixing two or more kinds.

Catalyst

The reaction mixture in step (p) may arbitrarily contain a catalyst that promotes hydrolysis and polycondensation of the silane compound. Specific examples of such a catalyst include an acidic catalyst and a basic catalyst, and the catalysts may be each used alone, or in combination of the acidic catalyst with the basic catalyst.

As the acidic catalyst, both an organic acid and an inorganic acid can be used.

Specific examples of the organic acid include formic acid, acetic acid, propionic acid, oxalic acid and citric acid, and specific examples of the inorganic acid include hydrochloric acid, sulfuric acid, nitric acid and phosphoric acid. Above all, hydrochloric acid and acetic acid are preferably used because a hydrolysis reaction and a subsequent polycondensation reaction can be easily performed, cost is low, and treatment after the reaction is easy.

Specific examples of the basic catalyst generally include hydroxide, oxide and carbonate of a metal in group Ia and group IIa of a periodic table, or a basic material such as an organic nitrogen compound and ammonia. More specifically, specific examples include ammonia, and also a basic compound such as sodium hydroxide, calcium hydroxide and potassium hydroxide, and a quaternary ammonium salt such as tetramethylammonium hydroxide, tetraethylammonium hydroxide, tetrabutylammonium hydroxide, benzyltrimethylammonium hydroxide, benzyltriethylammonium hydroxide, ammonium fluoride, tetrabutylammonium fluoride, benzyltrimethylammonium chloride and benzyltrimethylammonium chloride.

Moreover, when halogenated silane such as trichlorosilane is used as the silane compound, an acidic aqueous solution is formed in the presence of water, and the hydrolysis and polycondensation reactions progress without particularly adding the acidic catalyst separately, and therefore the catalyst is not required to be added separately.

Accordingly, the catalyst is an arbitrary component in step (p).

Conditions of Hydrolysis and Polycondensation Reactions

Next, reaction conditions of hydrolysis and polycondensation in step (p) will be described.

In the reaction mixture, a proportion of the silane compound is not particularly limited. The proportion is about 0.1 to about 30 parts by mass, preferably about 0.1 to about 25 parts by mass, and further preferably about 0.5 to about 20 parts by mass, based on 100 parts by mass of the reaction mixture, for example.

A proportion of the solvent is not particularly limited as long as the hydrolysis and/or polycondensation reactions described above progress. The proportion is about 100 to about 1,500 parts by mass, preferably about 200 to about 1,400 parts by mass, further preferably about 300 to about 1,300 parts by mass, and particularly preferably about 400 to about 1,200 parts by mass, based on 100 parts by mass of the silane compound, for example. In addition, when the proportion ranges are adopted, as described above, only water as the solvent may be used, or a mixed solvent of water and other solvents (alcohol, an organic solvent or the like) may be used.

When the catalyst is added thereto, a proportion thereof may be appropriately adjusted so as to obtain desired hydrolysis and polycondensation reactions, and is not particularly limited. The proportion is about 0.02 to about 15 parts by mass, preferably about 0.02 to about 10 parts by mass, further preferably about 0.02 to about 8 parts by mass, and when necessary, about 0.04 to about 7 parts by mass or about 0.08 to about 6 parts by mass, based on 100 parts by mass of the silane compound, for example.

An order of addition or a method of addition of each component is not particularly limited. In general, for example, the solvent and arbitrarily a catalyst solution are input into a reaction vessel, and when necessary, an atmosphere in the reaction vessel is replaced by a predetermined gas atmosphere (for example, an inert gas such as nitrogen, argon and helium), and then the silane compound is added (added dropwise) to the solution in the reaction vessel under stirring, and the hydrolysis and polycondensation reactions can be performed at a predetermined reaction temperature and a predetermined reaction time while stirring the reaction mixture.

Further, the reaction temperature of hydrolysis and/or polycondensation is not particularly limited, and specific examples include about −20° C. to about 80° C., preferably about 0° C. to about 70° C., and when necessary, about 0° C. to about 40° C. or about 10° C. to about 30° C., and ordinary temperature (e.g. room temperature; about 20° C. to about 25° C.). The reaction time is not particularly limited, either, and specific examples include about 0.5 to about 100 hours, and when necessary, about 1 to about 80 hours or about 1 to about 6 hours.

Then, pH of the reaction mixture only needs to be appropriately adjusted so that the hydrolysis and polycondensation reactions of the silane compound satisfactorily progress, and is not particularly limited. Thus, pH may be ordinarily selected in the range of about 0.8 to about 12 according to a shape or properties of a specific silane compound to be used or a desired organosilicon compound (polysilsesquioxane) product. Here, in adjustment of pH of the reaction mixture, an acid and a base containing the acidic catalyst and the basic catalyst as described above can be utilized.

Furthermore, in consideration of properties of the silane compound to be used or the shape and the properties of the desired organosilicon compound (polysilsesquioxane) product, in step (p), the organosilicon compound may be synthesized by first performing the hydrolysis reaction of the silane compound, and then performing the polycondensation reaction.

More specifically, when spherical polysilsesquioxane is particularly desired to be synthesized as the organosilicon compound, step (p) can be performed by dividing the reaction to a two-step reaction according to steps (p-1) and (p-2) as described below.

Step (p-1): the silane compound represented by formula (V) is subjected to hydrolysis under acidic conditions to produce a hydrolysate of the silane compound; and step (p-2): the hydrolysate produced in step (p-1) is subjected to polycondensation under basic conditions to obtain spherical polysilsesquioxane particles as the organosilicon compound.

In step (p-1), more specifically, the hydrolysate can be produced by hydrolyzing the silane compound in an acidic aqueous medium, and the hydrolysis reaction of the silane compound can be allowed to progress by adding the silane compound dropwise to the acidic aqueous medium, for example.

Here, in step (p-1), the acidic conditions in which a rate of the hydrolysis reaction is higher than a rate of the polycondensation reaction, and the hydrolysis reaction dominantly progresses are adopted so that desired hydrolysis may sufficiently progress. A pH range in which such acidic conditions are achieved is different depending on a kind of the silane compound serving as the raw material, and can be ordinarily adjusted to pH about 3 to about 6, and preferably adjusted to pH about 4 to about 6. In addition, a degree of the acidity influences an equilibrium of hydrolysate production, a reaction time, an amount of a partial condensate, the number of condensation thereof, or the like, but does not significantly influence the particle size.

In addition, as the acid that can be used in preparing the medium in the acidic pH range, the acidic catalyst only needs to be used, and acetic acid is most preferably used because the hydrolysis reaction and the subsequent polycondensation reaction can be easily controlled and performed, and availability and pH adjustment are also easy. For example, when an aqueous solution of diluted acetic acid is used as the acidic aqueous medium, a pH value becomes about 5.0 to about 5.8.

Next, in step (p-2), more specifically, the basic material is added to the reaction mixture containing the hydrolysate obtained in step (p-1) under stirring to adjust the reaction mixture to a basic mixture to cause polycondensation of the hydrolysate, and spherical polysilsesquioxane particles can be obtained as the organosilicon compound.

Here, in step (p-2), the basic conditions in which the rate of the polycondensation reaction is higher than the rate of the hydrolysis reaction, and the polycondensation reaction dominantly progresses are adopted so that a desired polycondensation reaction may sufficiently progress. A pH range in which such basic conditions are achieved is different depending on the kind of the silane compound serving as the raw material, and only needs to be appropriately set, but is generally ordinarily pH about 3 or less or pH about 7 or more. Among the ranges, in order to obtain spherical single particle bodies each having a uniformized particle size, the range is preferably adjusted to pH about 7 to about 12. The particle size obtained is decreased according to intensity of basicity. Moreover, in general, if a substrate concentration is increased, a polymerization degree is raised, and the particle size is increased.

As the basic material used for adjusting the pH value to the range of pH about 7 to about 12, the basic catalyst only needs to be used, but ammonia is most preferred because elimination after the reaction is easy. As ammonia, a material prepared by appropriately diluting aqueous ammonia, for example, commercially available aqueous ammonia having a concentration of 28% by weight by about 2 to about 100 times may be used. When aqueous ammonia is used as the basic material, the pH value of the reaction mixture obtained in step (p-1) becomes about 7.8 to about 10.1 as a final polycondensation reaction system, and a solution in a state in which the spherical polysilsesquioxane particles are uniformly dispersed through the polycondensation reaction can be obtained.

Further, upon the hydrolysis reaction in step (p-1) and the polycondensation reaction in step (p-2), a shape, a size, a particle size distribution or the like of polysilsesquioxane particles to be produced can also be adjusted by changing a stirring rate of the reaction mixture, a rate of adding each material or the like.

The production method for the core-shell structure according to the invention may further arbitrarily include at least one of steps as described below.

Step (a): polysilsesquioxane is produced through the hydrolysis reaction and the polycondensation reaction, and then a liquid fraction is arbitrarily separated and removed by a method of filtration and separation (for example, pressure filtration), solid-liquid separation, solvent distillation-off, centrifugation, decanting or the like, and a solid fraction obtained is provided as a sample for an object of polysilsesquioxane to be heat-treated in step (q-1) or (q-2), in which, as a method for separating such a solid content and liquid, various general-purpose technologies are known to those skilled in the art, and therefore such a method can be appropriately used; and step (b): further, the solid fraction obtained is washed with water or an organic solvent, and the organic solvent is distilled off, and the resulting material is dried (drying under reduced pressure and/or heating drying), or the like.

Composition for Negative Electrode and Production Method Therefor

According to another aspect of the invention, the composition for the negative electrode is disclosed. The composition for the negative electrode contains the core-shell structure as the negative electrode active material.

Furthermore, according to another aspect of the invention, the production method for the composition for the negative electrode is also disclosed. The production method for the composition for the negative electrode includes obtaining of the composition for the negative electrode by using the core-shell structure as the negative electrode active material.

The composition for the negative electrode according to the invention may further contain an additional component such as a carbon-based conductivity agent and/or a binder as described below.

Specific examples of a carbon-based material functioning as the carbon-based conductivity agent preferably include a carbon-based material such as graphite, carbon black, fullerene, a carbon nanotube, a carbon nanofoam, pitch-based carbon fibers, polyacrylonitrile-based carbon fibers and non-crystalline carbon. The carbon-based materials may be used alone, or in a mixture of two or more kinds thereof.

The binder used in the invention is sufficient as long as the binder can be used in the secondary battery, and specific examples thereof include carboxymethylcellulose, polyacrylic acid, alginic acid, glucomannan, amylose, saccharose, and a derivative or a polymer thereof, and further an alkali metal salt thereof, and also a polyimide resin and a polyimideamide resin. The binders may be used alone, or in a mixture of two or more kinds thereof.

Further, in addition to the binder, for example, an additive that can provide the composition with another function such as improving binding properties between a collector and the negative electrode active material, improving dispersibility of the negative electrode active material, and improving conductivity of the binder itself can also be added thereto, when necessary. Specific examples of such an additive include a styrene-butadiene rubber-based polymer and a styrene-isoprene rubber-based polymer.

When the composition for the negative electrode according to the invention further contains the additional component such as the carbon-based conductivity agent and/or the binder as described above, the production method for the composition for the negative electrode according to the invention may include the following step (r):

step (r): the core-shell structure of the invention and the additional component are mixed, or the additional component is complexed with the core-shell structure of the invention or coated thereon.

Specific techniques that can be utilized in achieving step (r) include a method for dispersing the carbon-based material into the core-shell structure by a mechanical mixing method using various stirring bars, a stirring blade, mechano-fusion, a ball mill, a vibrating mill or the like, and above all, dispersion treatment by a thin-film spin system achievable using Thin-Film Spin System High-Speed Mixer {Filmix (registered trademark) series} made by PRIMIX Corporation or the like is preferably used. In the production method for the composition for the negative electrode according to the invention, the composition for the negative electrode may be obtained by using alone one kind of the mechanical mixing method and a dispersion method, or the composition for the negative electrode may be obtained by stepwise combining a plurality of techniques.

For example, in step (r), the core-shell structure of the invention and arbitrarily the carbon-based conductivity agent may be added each by a predetermined amount to a binder aqueous solution having a concentration of about 1 to about 5% by weight, and mixed by using the stirring bar, other mixers or the like. Further, water may be further added to the resulting mixture, when necessary, to be in a predetermined solid content concentration, and stirring is further continued into a slurry composition, and the resulting composition may be used as the composition for the negative electrode of the invention. Furthermore, a material obtained by applying dispersion treatment to the slurry composition by the thin-film spin system may be used as the composition for the negative electrode of the invention.

Further, in step (r) to be arbitrarily selected s described above, the core-shell structure and the carbon-based material only need to be mixed at an arbitrary proportion appropriately according to a purpose or so as to obtain desired battery characteristics.

In addition, the production method for the composition for the negative electrode according to the invention may arbitrarily include, prior to the steps described above, each step that may be included in the method for producing the core-shell structure, and an embodiment including the arbitrary steps is also clearly disclosed in the present specification.

Negative Electrode and Production Method Therefor

According to another aspect of the invention, the negative electrode is disclosed.

Further, according to another aspect of the invention, the method for producing the negative electrode is also disclosed, and the negative electrode of the invention is obtained according to the method for producing the negative electrode. The method includes obtaining of the negative electrode using the core-shell structure or the composition for the negative electrode.

Specific examples of a production step thereof will be described below.

Specifically, the negative electrode of the invention is produced by using the core-shell structure as the negative electrode active material, or the composition for the negative electrode, containing the core-shell structure as the negative electrode active material.

More specifically, for example, the negative electrode may be produced on the basis of a method for shaping the core-shell structure or the composition for the negative electrode into a predetermined form, or a method for applying the core-shell structure or the composition for the negative electrode onto the collector such as copper foil. As the method for shaping the negative electrode, an arbitrary method only needs to be used without any particular limitation, and various publicly-known methods may be used.

More specifically, for example, the composition for the negative electrode previously prepared may be directly coated on the collector mainly containing copper, nickel, stainless steel or the like in a rod form, a plate form, a foil form, a net form or the like according to a technique such as a doctor blade method, a slurry casting method and a screen printing method. Alternatively, a negative electrode plate may be formed by separately casting the composition for the negative electrode on a support, peeling a film of the composition for the negative electrode formed on the support, and laminating the peeled film of the composition for the negative electrode on the collector.

In addition thereto, a final negative electrode may be obtained by performing a drying treatment step by air-drying treatment or the predetermined temperature to the composition for the negative electrode coated on the collector or the support, and/or further performing a processing treatment step by pressing treatment, punching treatment or the like, when necessary.

In addition, the method for producing the negative electrode according to the invention may arbitrarily include, prior to the steps described above, each step that may be included in the method for producing the core-shell structure and the method for producing the composition for the negative electrode, and an embodiment thereof is also clearly disclosed in the present specification. In addition thereto, a form of the negative electrode is described for illustrative purpose only, and the form of the negative electrode is not limited thereto, and can be obviously provided as any other form.

Secondary Battery and Production Method Therefor

According to another aspect of the invention, the secondary battery is provided.

Further, according to another aspect of the invention, a production method for the secondary battery is also provided. The method includes production of the secondary battery by using the negative electrode described above.

The secondary battery according to the invention has at least one negative electrode of the invention. As long as the secondary battery according to the invention has at least one negative electrode of the invention, and functions as the secondary battery, other components and a structure are not particularly limited. More specifically, the secondary battery has, in addition to the negative electrode, at least one positive electrode and at least one separator, respectively. When the secondary battery according to the invention has a plurality of negative electrodes of the invention, a plurality of positive electrodes of the invention and a plurality of separators of the invention, respectively, a laminate type stacked structure in which the components are alternately stacked in the order of the positive electrode, the separator, the negative electrode and the separator may be adopted. Alternatively, a stacked structure in which the positive electrode and the negative electrode are wound in a coil form through the separator may be adopted. Furthermore, the secondary battery according to the invention may contain an electrolyte or a solid electrolyte.

Specifically, the secondary battery according to the invention is the secondary battery obtained by the production method for the secondary battery according to the invention. In consideration of a desired application, function or the like, the secondary battery only needs to be appropriately designed, and a configuration thereof is not particularly limited, but the secondary battery can be configured using the negative electrode according to the invention with reference to the configuration of an existing secondary battery. In addition thereto, a type of the secondary battery according to the invention is not particularly limited as long as the negative electrode can be applied thereto, and specific examples include a lithium ion secondary battery and a lithium ion polymer secondary battery. As is demonstrated in Examples described below, the batteries can be referred to as a particularly preferred embodiment because desired advantageous effects of the invention can be produced.

Hereinafter, an embodiment when the secondary battery according to the invention and the production method therefor are particularly the lithium ion secondary battery will be described as an example.

First, a positive electrode active material that can reversibly absorb and release a lithium ion, a conductivity agent, the binder and the solvent are mixed to arrange a positive electrode active material composition. In a manner similar to the negative electrode, the positive electrode active material composition is directly coated on a metal collector and dried by using various techniques to arrange a positive plate.

The positive electrode can also be produced by separately casting the positive electrode active material composition on the support, peeling the film formed on the support, and laminating the film on the metal collector. A method for shaping the positive electrode is not particularly limited, and the positive electrode can be formed by using various publicly-known techniques.

As the positive electrode active material, lithium metal complex oxide generally used in the field of the secondary battery can be used. Specific examples include lithium cobalt oxide, lithium nickel oxide, lithium manganese oxide having a spinel structure, lithium cobalt manganese oxide, iron phosphate having an olivine structure, so-called ternary lithium metal complex oxide and nickel-based lithium metal complex oxide. Moreover, $V_2O_5$, TiS, MoS and the like, being a compound that can release and intercalate the lithium ion, can also be used.

The conductivity agent may be added thereto, and a material generally used in the lithium ion battery can be utilized. The material is preferably an electron conductive material causing no decomposition or no deterioration in the produced battery. Specific examples include carbon black (such as acetylene black), graphite particulates, vapor-grown carbon fibers and a combination of two or more kinds thereof. Moreover, specific examples of the binder include a vinylidene fluoride-hexafluoropropylene copolymer, polyvinylidene fluoride (PVDF), polyacrylonitrile, polymethyl methacrylate, polytetrafluoroethylene and a mixture thereof, and a styrene-butadiene rubber-based polymer, but are not limited thereto. In addition, specific examples of the solvent include N-methyl pyrrolidone, acetone and water, but are not limited thereto.

On the occasion, a content of the positive electrode active material, the conductivity agent, the binder and the solvent is not particularly limited, and can be appropriately selected by applying an amount generally used in the lithium ion battery as a measure.

As the separator to be interposed between the positive electrode and the negative electrode, a material generally utilized in the lithium ion battery only needs to be used, and is not particularly limited, and only needs to be appropriately selected in consideration of the desired application, function or the like. The material having low resistance to ion migration of the electrolyte, or excellent electrolyte impregnation ability is preferred. Specific examples include a material selected from glass fibers, polyester, polyethylene, polypropylene, polytetrafluoroethylene, polyimide or a compound thereof, and the material may be in the form of a nonwoven fabric or a woven fabric.

More specifically, in the case of the lithium ion battery, a windable separator formed of a material such as polyethylene and polypropylene is preferably used, and in the case of a lithium ion polymer battery, the separator having excellent organic electrolyte impregnation ability is preferably used.

As the electrolyte, such an electrolyte can be used as a material prepared by dissolving one kind or a mixture of two or more kinds of electrolytes formed of a lithium salt such as lithium hexafluorophosphate, lithium tetrafluoroborate, lithium hexafluoroantimonate, lithium hexafluoroarsenate, lithium perchlorate, lithium trifluoromethanesulfonate, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (in which, x and y are a natural number), LiCl and LiI in the solvent such as propylene carbonate, ethylene carbonate, dimethyl carbonate, diethyl carbonate, ethyl methyl carbonate, methyl propyl carbonate, butylene carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene or diethyl ether or a mixed solvent thereof.

Moreover, various nonaqueous electrolytes or solid electrolytes can also be used in place of the electrolyte. For example, various ionic liquids to which the lithium ion is added, a quasi-solid electrolyte in which the ionic liquid and fine powder are mixed, a lithium ion conductive solid electrolyte or the like can be used.

Furthermore, for the purpose of improving charging and discharging cycle performance, a compound that promotes stable coating formation on a surface of the negative electrode active material can also be appropriately incorporated into the electrolyte described above. For example, such a material is effective as vinylene carbonate (VC), fluorobenzene, and fluorinated carbonate such as cyclic fluorinated carbonate (including fluoroethylene carbonate (FEC) and trifluoropropylene carbonate (TFPC)), or linear fluorinated carbonate (including trifluorodimethyl carbonate (TFDMC), trifluorodiethyl carbonate (TFDEC) and trifluoromethyl methyl carbonate (TFEMC)). In addition, the cyclic fluorinated carbonate and the linear fluorinated carbonate can also be used as the solvent such as ethylene carbonate.

The lithium ion battery may be completed by disposing the separator between a positive electrode plate and the negative electrode plate as described above to form a battery structure, and winding or folding such a battery structure into a cylindrical battery case or a rectangular battery case, and then injecting the electrolyte thereinto. Alternatively, the lithium ion polymer battery as the secondary battery of the invention may be obtained by stacking the battery structures into a bicell structure, and then impregnating the resulting material into an organic electrolyte, and putting the thus obtained material in a pouch and sealing the pouch.

In addition, the production method for the secondary battery according to the invention may further include, in addition to the steps described above and prior to the steps, each step included in the production method for the core-shell structure, the production method for the composition for the negative electrode, and the production method for the negative electrode.

Hereinafter, the invention will be described more specifically by describing Examples and Comparative Examples, but the invention is not limited to the Examples.

EXAMPLES

Various analyses and evaluations were conducted on a material produced in each Example and each Comparative Example.

First, methods of various analyses and evaluations are described below.

In addition, hereinafter, "Ph" represents a phenyl group, and "Me" represents a methyl group.

Observation Using Scanning Electron Microscope (SEM)

Observation using SEM was performed on each material produced in Examples and Comparative Examples.

Measurement was carried out at arbitrary accelerating voltage by using an ultra-high resolution analytical scanning electron microscope SU-70 and a scanning electron microscope SU8020 (both made by Hitachi High-Tech Science Corporation) as an SEM.

Elemental Analysis Using Auger Electron Spectroscopy (AES)

An elemental composition of a core, and a surface layer and an intermediate layer (shell) was analyzed on a core-shell structure produced in Examples.

In addition, an AES analysis was conducted on a cross section of a SiOC particle cut by ion milling processing at an electron beam accelerating voltage of 10 kV by using scanning Auger photoelectron spectroscopy (AES/SAM) PHI710 (made by ULVAC-PHI, Inc.) as a measuring instrument.

Method of Elemental Analysis

An elemental analysis was conducted by using NCH-21 model made by Sumika Chemical Analysis Service, Ltd. as a carbon elemental analyzer using an oxygen circulation combustion system and a TDC detection system with regard to the elemental analysis of carbon, by using EMGA-2800 made by Horiba, Ltd. as an oxygen elemental analyzer using a high temperature carbon reaction and NDIR detection system with regard to the elemental analysis of oxygen and by using SPS 4000 made by Seiko Instruments Inc. as a silicon elemental analyzer by ashing-alkali fusion-acid dissolution and ICP spectrometry with regard to the elemental analysis of Si, respectively.

Laser Raman Spectrometry

A carbonaceous material was detected and analyzed on the materials produced in Examples and Comparative Examples by Laser Raman spectroscopy. More specifically, measurement was carried out by using Laser Raman Microscope RAMAN-11 (made by Nanophoton Corporation) as a Laser Raman spectroscopy instrument under the following conditions:

(1) laser wavelength: 532 nm;
(2) data acquisition: an averaged spectrum was obtained by setting an exposure time to 10 seconds to measure spectra five times at one measurement point;
(3) grating: 300 lines/mm; and
(4) objective lens: magnification: 50 times (NA=0.80).

Elemental Analysis by X-Ray Photoelectron Spectroscopy (XPS)

A surface layer was analyzed, by XPS, on the materials produced in Examples and Comparative Examples. More specifically, measurement was carried out by using Quantera SXM (made by ULVAC-PHI, Inc.) as an X-ray photoelectron spectroscopy instrument under the following conditions:

(1) X-rays: monochromatic Al Kα (hv=1,486.6 eV) 25 W/15 kV;
(2) measurement area: 100 μmφ; and
(3) measurement procedures: a surface element species was confirmed by a survey scan (binding energy range: 0 to 1,200 eV; pass energy: 224 eV; number of sweeps: 3 times), and then a narrow scan was carried out under conditions described below, in which C (C1s) photoelectron spectra were obtained at a pass energy of 26 eV and the number of sweeps of 12 times; and
(4) charge neutralization during measurement: yes.

Powder Resistance Measurement

Volume resistivity of powder was measured on the materials produced in Examples and Comparative Examples by using a powder resistance measuring instrument. More specifically, measurement was carried out by using a powder resistivity measuring system MCP-PD51 (made by Mitsubishi Chemical Analytech Co., Ltd.) under the following conditions:

(1) applied load: 15 kN;
(2) detection method: four-point probe array; and
(3) electrode spacing: 3 mm.

Evaluation of Battery Characteristics

A negative electrode active material containing the material produced in Examples and Comparative Examples was prepared, and a charge-discharge cycle test was conducted on a negative electrode using the thus obtained negative electrode active materials and a lithium ion secondary battery as described below to evaluate battery characteristics. Procedures thereof are described below.

Measurement was carried out at a constant current on both charge and discharge by using HJR-110mSM, HJ1001SM8A or HJ1010mSM8A made by Hokuto Denko Corporation. On the above occasion, a current value was adjusted to 0.05 C to be 1/20 per 1 g of weight of the negative electrode active material (SiOC particles) based on theoretical capacity.

In addition, charge was taken as capacity until a battery voltage decreases to 0 V, and discharge was taken as capacity until the battery voltage arrives at 1.5 V. During switching between charge and discharge for each, operation was rested for 30 minutes in an open circuit, and then discharge was carried out.

Evaluation was performed also on cycle performance under similar conditions. However, a long period of time is required in one cycle at the current value described above, and therefore in and after a third cycle, the evaluation was performed by increasing the current value from 0.05 C to a current value equivalent to 0.5 C.

Moreover, reversible capacity was taken as first discharging capacity, and a first charging and discharging rate was taken as a rate of the discharging capacity to charging capacity in a first cycle, and a capacity retention ratio after a cycle test was represented by the charging capacity after the cycles to first charging capacity.

Preparation of Polysilsesquioxane

Synthesis Example 1

While 222.9 g of an acetic acid aqueous solution at pH 5.3 adjusted to 1.3 ppm by weight was stirred in a 500 mL four-necked flask, a mixture of 27.24 g (0.200 mol) of methyltrimethoxysilane and 9.91 g (0.050 mol) of phenyltrimethoxysilane was added dropwise thereto. After completion of dropwise addition, the resulting mixture was stirred at room temperature for 2 hours without change, and then 7.90 g of 0.37 wt % aqueous ammonia was added dropwise thereto while the resulting mixture was stirred to adjust pH to 9.5. After completion of dropwise addition, the resulting mixture was further stirred at room temperature without change, and then stirring was stopped, and the resulting mixture was left to stand overnight.

The resulting white cloudy liquid of polysilsesquioxane was subjected to filtration by a 100 mesh wire mesh, and then the resulting material was subjected to suction filtration by a membrane filter having an opening of 1 micrometer to obtain 19.34 g of spherical polysilsesquioxane (1).

Synthesis Example 2

While 458.0 g of an acetic acid aqueous solution at pH 5.3 adjusted to 1.3 ppm by weight was stirred in a 1,000 mL four-necked flask, 66.11 g (0.500 mol) of methyltrimethoxysilane was added dropwise thereto. After completion of dropwise addition, the resulting mixture was further stirred at room temperature without change, and then 16.08 g of 0.37 wt % aqueous ammonia was added dropwise thereto while the resulting mixture was stirred to adjust pH to 9.3. After completion of dropwise addition, the resulting mixture was further stirred at room temperature without change, and then stirring was stopped, and the resulting mixture was left to stand overnight.

The resulting white cloudy liquid of polysilsesquioxane was subjected to filtration by a 100 mesh wire mesh, and then the resulting material was subjected to suction filtration by a membrane filter having an opening of 1 micrometer to obtain 33.83 g of spherical polysilsesquioxane precursor (2).

Example 1

Preparation of Core-Shell Structure

Figure 8:
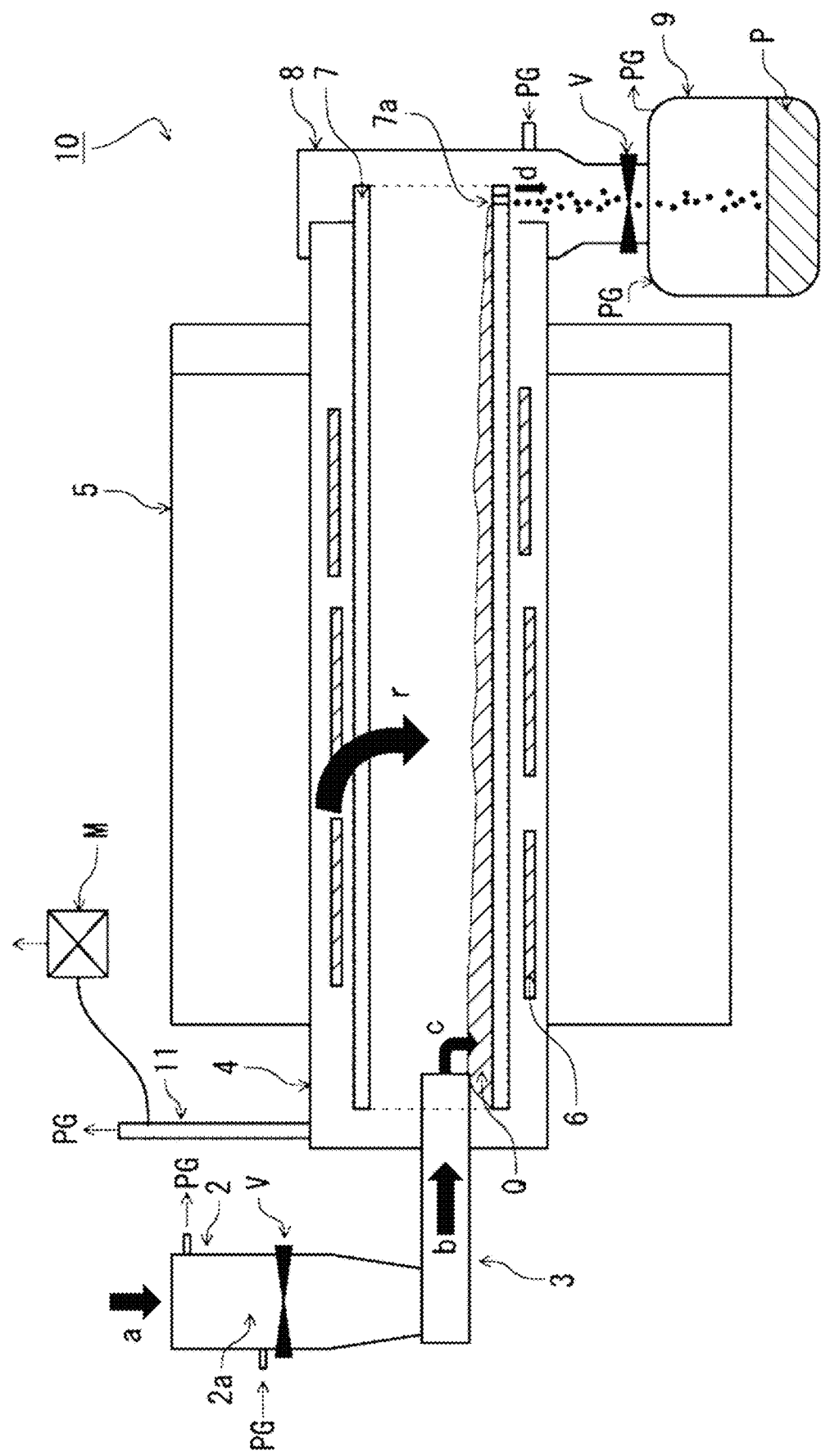
FIG. 8 is a diagram showing a structure of a rotary kiln used in Example 1.

In the present Example, schematically, SiOC particles were produced by applying heat treatment to spherical polysilsesquioxane (1) obtained in Synthesis Example 1 by using a rotary kiln having a structure as shown in FIG. 8.

In FIG. 8, schematically, rotary kiln 10 has raw material input hopper 2, raw material feeder 3, cylindrical retort member 7 in which heat treatment of raw material Q such as polysilsesquioxane is performed, cylindrical heating chamber 4 with exhaust path 11, through cylindrical heating chamber 4 retort member 7 is penetrated, heater 6 arranged inside the heating chamber 4, insulation chamber 5 arranged outside the heating chamber 4, and collection unit 8 for collecting SiOC structure P produced by the heat treatment into collection container 9. In addition thereto, in FIG. 8, arrows a, b, c, and d indicate a traveling direction of the above-described heat treatment object or product (silicon oxide/silicon oxide structure), and arrow r indicates a direction of rotation of retort member 7. Further, reference sign PG indicates a purge gas, reference sign V indicates a valve installed in each member, reference sign M indicates an oxygen content meter, reference sign 2a indicates a gas substitution chamber in raw material input hopper 2, and reference sign 7a indicates a slit portion in retort member 7, respectively.

More specifically, as a material of retort member 7, a CIP (Cold Isostatic Pressing) graphite material was used, and a carbon heater having predetermined capacity was used to be able to control temperature as described below. In addition thereto, with regard to a dimension of retort member 7, a retort length was adjusted to 1,800 mm.

With regard to arrangement of the heaters, heaters 6 were arranged on an upper part and a lower part of the retort member in FIG. 8, but in the present Example, heaters arranged on left and right sides of the retort member, respectively, were used. In addition thereto, a carbon insulation was arranged around a heating furnace, and further a water cooling jacket was attached to an outer shell.

Feeding into the retort was performed in such a manner that spherical polysilsesquioxane (1) was input into the gas substitution chamber, gas substitution was made using an argon gas, and then the resulting material was dropped into the hopper, and fed at a feed rate of 1 kg per hour by using a screw feeder, and a retort revolution speed was adjusted to be 1 hour in a residence time in a heating zone by the heater. In addition thereto, into an inside of the retort, a mixed gas of the argon gas and a hydrogen gas (4 vol %) was fed at a flow rate of 10 L/min, and while a non-oxidizing gas atmosphere was maintained, a gas produced by pyrolysis of spherical polysilsesquioxane (1) was purged to an exhaust gas pipe.

A heat treatment temperature was controlled to be 1,200° C. in a temperature of the retort, and spherical polysilsesquioxane (1) was heat-treated to obtain a SiOC structure.

First, spherical polysilsesquioxane (1) being a raw material was supplied from a feeder into the non-oxidizing gas atmosphere in the retort previously heated to 1,200° C., and exposed thereto to be rapidly heated.

Here, a temperature of the feeder is approximately room temperature before entering into an apparatus, but a tip portion of the feeder was within the apparatus, and a temperature of the tip portion of the feeder within the apparatus is about 300 to about 500° C. In addition thereto, a distance from the above-described room temperature portion to a raw material drop port at the tip within the feeder is short, and a movement time of raw material powder is about 1 minute.

The thus obtained silicon oxide described above was disintegrated and classified by using a stainless steel vibration sieving machine having an opening of 32 μm into which 3 mmφ-alumina balls were charged to obtain SiOC particles (3) having a maximum particle size of 32 μm.

The thus obtained SiOC particles (3) were analyzed by various analysis methods described above.

Preparation of Negative Electrode

To 20 g of a 2 wt % aqueous solution of carboxymethylcellulose, 3.2 g of SiOC particles (3) and 0.4 g of acetylene black made by Denka Company Limited were added, and the resulting mixture was mixed in a flask for 15 minutes using a stirring bar, and then distilled water was added thereto to be 15% by weight in a solid content concentration, and the resulting mixture was further stirred for 15 minutes to prepare a slurry composition. The resulting slurry composition was transferred to a thin-film spin system high-speed mixer (FILMIX 40-40 model) made by Primix Corporation, and the resulting mixture was stirred and dispersed at a revolution speed of 20 m/s for 30 seconds. The slurry after dispersion treatment was coated onto a copper foil roll at a thickness of 150 μm by a doctor blade method.

After coating, the punching material was air-dried for 30 minutes, and then dried on a hot plate at 80° C. for 90 minutes. After being dried, the thus obtained negative electrode sheet was pressed with a 2 t small precision roll press (made by Thank-Metal Co., Ltd.). After being pressed, an electrode was punched out with a 14.50 mmφ-electrode punching tool HSNG-EP, and the resulting material was dried in a glass tube oven GTO-200 (SIBATA) at 80° C. for 12 hours or more under reduced pressure to prepare a negative electrode.

Preparation of Lithium Ion Secondary Battery and Evaluation Thereof

Figure 9:
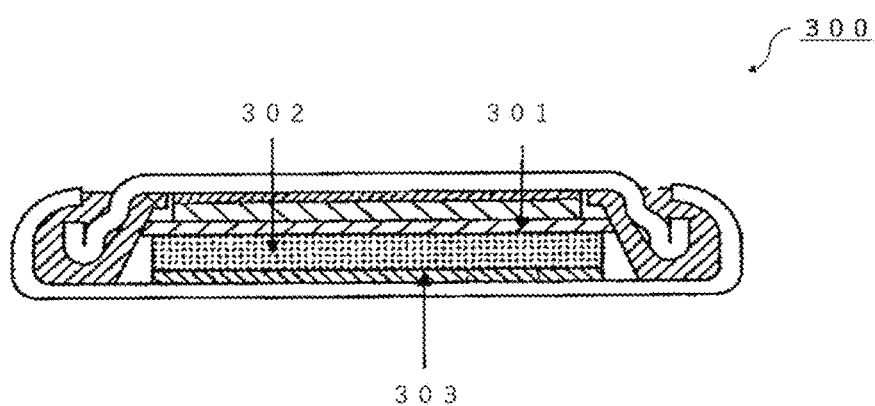
FIG. 9 shows a configuration example of a coin-type lithium ion battery.

A 2032 type coin cell 300 having the structure shown in FIG. 9 was prepared. Metallic lithium was used as positive electrode (lithium counter electrode) 303, a microporous polypropylene film was used as separator 302, the above-described negative electrode was used as negative electrode (negative electrode material) 301, and a mixed solvent of ethylene carbonate and diethyl carbonate at a ratio of 1:1 (volume ratio) in which $LiPF_6$ was dissolved at a ratio of 1 mol/L was used as an electrolyte.

Next, battery characteristics of the lithium ion secondary battery were evaluated. As a charging and discharging tester, HJ1001SM8A made by Hokuto Denko Corporation was used. As charging and discharging conditions, both of charge and discharge were performed at a constant current of 0.05 C, and a discharge cut-off voltage was set to 1 mV, and a charge cut-off voltage was set to 1,500 mV.

Comparative Example 1 Preparation of SiOC Particles for Comparison Purpose

On an alumina boat of SSA-S grade, 15.0 parts by weight of spherical polysilsesquioxane (1) obtained in Synthesis Example 1 were placed, and then the boat was set in a vacuum purge type tube furnace KTF43N1-VPS (made by Koyo Thermo System Co., Ltd.), and as heat treatment conditions, heat treatment was applied thereto at 1,200° C. for 1 hour by being heated to 1,200° C. at a rate of 4° C./min, while Ar was fed at a flow rate of 200 mL/min, under an argon atmosphere (high purity argon: 99.999%), and then being cooled to 50° C. or lower, and the boat was taken out from the tube furnace to obtain SiOC particles.

Results
Observation Using SEM

Figure 1A:
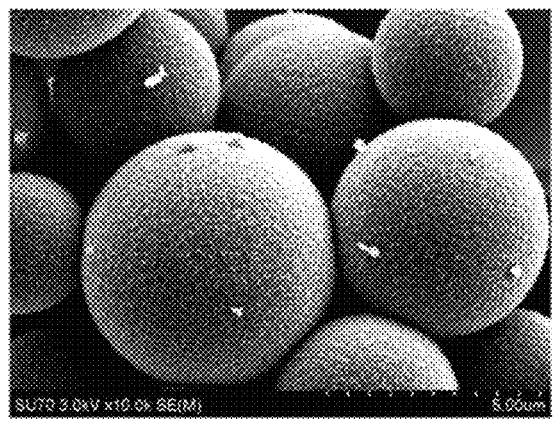
FIG. 1A and FIG. 1B are diagrams showing a scanning electron microscope (SEM) photograph of core-shell particles obtained in Example 1 and SiOC particles obtained in Comparative Example 1.
Figure 1B:
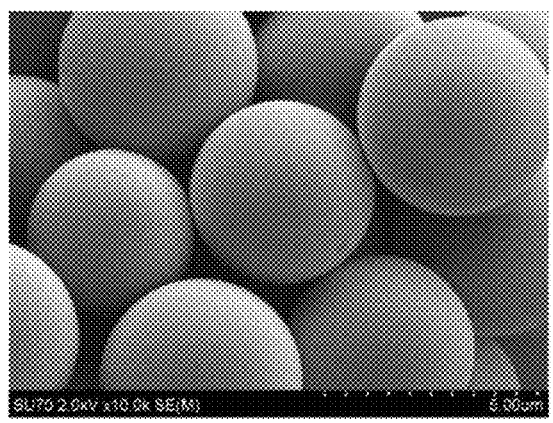

FIG. 1A and FIG. 1B show SEM images of SiOC particles (3) produced in Example 1 and SiOC particles (4) produced in Comparative Example 1.

First, FIG. 1A shows a SEM image of SiOC particles (3) produced in Example 1 (magnification: 10,000 times). Meanwhile, FIG. 1B shows a SEM image of SiOC particles (4) produced in Comparative Example 1 (magnification: 10,000 times).

Comparison of SiOC particles (3) (Example 1) with SiOC particles (4) (Comparative Example 1) in the SEM images reveals that, while a surface of SiOC particles (4) is relatively smooth, a rough and secondary structure is formed on a surface of SiOC particles (3).

In order to conduct detailed analysis on a surface layer and an internal structure of SiOC particle (3) according to Example 1, SiOC particle (3) was cut by ion milling processing, and a cross section thereof was observed by using a SEM. FIG. 2 shows a SEM image of the cross section of SiOC particle (3) (magnification: 50,000 times).

As is observed in the SEM image in FIG. 2, SiOC particle (3) was revealed to have a form of spherical core-shell structure 100 formed of spherical core 101, and a shell formed of intermediate layer 102 surrounding a surface of the core, and surface layer 103 formed on the intermediate layer.

AES Analysis

Figure 3:
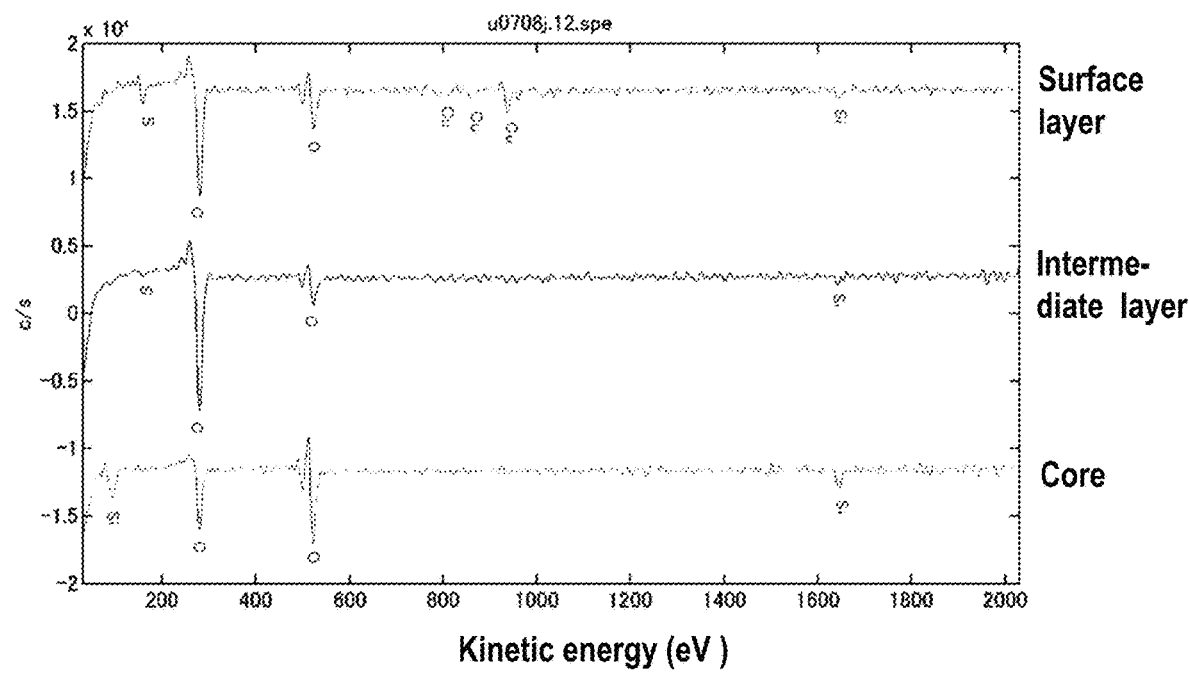
FIG. 3 is a diagram showing an AES spectrum obtained on each site of the core-shell particles obtained in Example 1.

Next, in order to examine a detailed elemental composition of each portion of core 101, intermediate layer 102, and surface layer 103 observed in SiOC particles (3), the above-described AES analysis was conducted thereon. FIG. 3 shows the thus obtained AES spectra, and Table 1 shows the thus acquired profile of the elemental composition of each portion.

TABLE 1

The results of AES elemental analysis of core-shell particles (SiOC particles (3))

| | | Element | | |
|---|---|---|---|---|
| Measuring portion | Item | C | O | Si |
| Surface layer | Ratio to Si | 12 | 1.7 | 1.0 |
| | Content ratio (mol %) | 76 | 11 | 6.4 |
| Intermediate layer | Ratio to Si | 15 | 1.3 | 1.0 |
| | Content ratio (mol %) | 87 | 7.3 | 5.8 |
| Core | Ratio to Si | 3.2 | 1.6 | 1.0 |
| | Content ratio (mol %) | 55 | 28 | 17 |

※N.D. represents below the detection limit (1 mol %).

In Table 1, as is known from comparison of a ratio of an element to Si in each portion, a content of carbon (C) was found to be higher in the surface layer and the intermediate layer than in the core, and the content of carbon in the intermediate layer was found to be the highest.

Elemental Composition Analysis and Raman Spectrometry on Material as a Whole

Further, the elemental composition was investigated on SiOC particles (3) and SiOC particles (4) by the elemental analysis method described above, and a surface analysis was further conducted thereon by the above-described Raman spectroscopy.

Table 2 shows results of elemental analysis of SiOC particles (3) and SiOC particles (4), and values of various peak height ratios obtained from Raman spectra, and FIGS. 4 and 5 show Raman spectra acquired on the materials described above.

TABLE 2

The results of elemental composition analysis

| | | Element | | | | | |
|---|---|---|---|---|---|---|---|
| | Item | Si | C | O | Ratio of free carbon | Ratio $H_D/H_G$ | Ratio $H_G/H_m$ |
| SiOC particles (3) (Example 1) | Ratio to Si | 1.0 | 1.50 | 1.58 | $SiO_{1.58}C_{0.21}$ + 1.29C | 1.29 (0.07) | 2.93 (0.22) |
| | Content ratio (mol %) | 38.3 | 24.5 | 34.5 | | | |

TABLE 2-continued

The results of elemental composition analysis

| | | Element | | | | | |
|---|---|---|---|---|---|---|---|
| | Item | Si | C | O | Ratio of free carbon | Ratio $H_D/H_G$ | Ratio $H_G/H_m$ |
| SiOC particles (4) (Comparative Example 1) | Ratio to Si Content ratio (mol %) | 1.0 40.7 | 1.33 23.0 | 1.47 34.1 | $SiO_{1.47}C_{0.27}$ + 1.06C | 1.50 (0.06) | 1.75 (0.05) |

※The value in the parentheses represents standard deviation.

As shown in Table 2, while a ratio of free carbon is 1.06 in SiOC particles (4), the ratio of free carbon is 1.29 in SiOC particles (3). More specifically, a proportion of carbon (C) in SiOC particles (3) was found to be comparatively raised. The reason is estimated such that elimination of a Si-containing chemical group and graphitization of an organic component are specially accelerated in a surface layer portion of the polysilsesquioxane particles by rapid heating with a high heating rate.

In addition, with regard to the ratio of free carbon, in consideration of molecular bonding in which Si bonds with four elements without exception, and a bonding partner of Si is O or C, and O bonds with Si without exception, an amount ratio of a Si—O bond and a SiC bond is determined in elemental composition analysis, and a ratio of remaining C is calculated as the ratio of free carbon (refer to J. Am. Ceram. Soc., Volume 89, Issue 7, p 2188-2195 (2006)).

Next, if attention is paid to the measurement results by Raman spectroscopy, as shown in Table 2, a ratio $H_G/H_m$ of SiOC particles (3) is recognized to be significantly higher than the ratio of SiOC particles (4). A significantly high ratio $H_G/H_m$ as described above substantiates that a graphene layer structure is developed in the surface layer portion of SiOC particles (3).

More specifically, the results described above indicated that core-shell particles encapsulating the spherical core formed by containing a relatively large amount of graphite carbon in the shell in which the graphene layer structure is developed can be produced by rapidly heating polysilsesquioxane during heat treatment of polysilsesquioxane serving as the raw material, more specifically, by adopting a form in which polysilsesquioxane is heated at a relatively high heating rate to apply heat treatment thereto.

XPS Analysis

For further analysis of the surface layer of SiOC particles (3) and SiOC particles (4), the materials described above were further provided for XPS analysis.

Figure 6B:
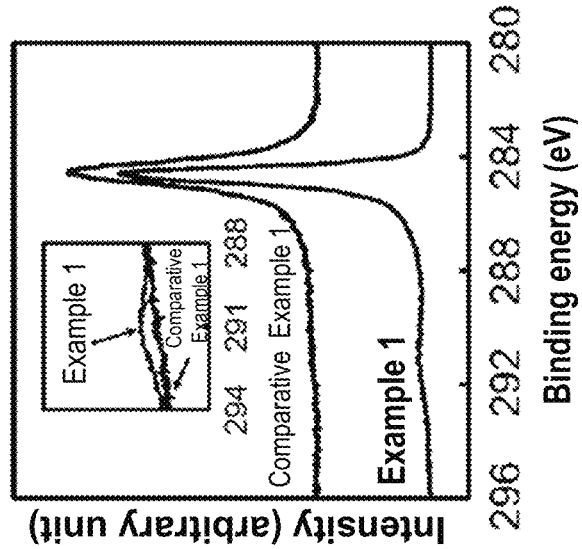
FIG. 6A and FIG. 6B are diagrams showing an X-ray photoelectron spectroscopy (XPS) spectrum obtained in the core-shell particles obtained in Example 1 and the SiOC particles obtained in Comparative Example 1.
Figure 6A:
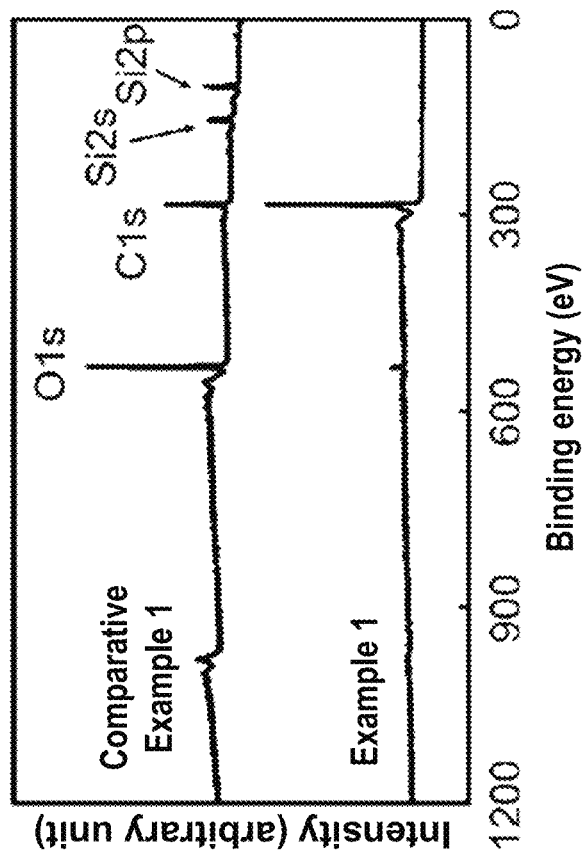

Table 3 shows element compositions (C/O/Si) obtained by the XPS analysis, and FIGS. 6(a) and 6(b) show XPS spectra.

TABLE 3

C/O/Si element compositions

| | | Element | | |
|---|---|---|---|---|
| | Item | C | O | Si |
| SiOC particles (3) (Example 1) | Ratio to Si Content ratio (Atom %) | 79.2 95.0 | 3.2 3.8 | 1.0 1.2 |
| SiOC particles (4) (Comparative Example 1) | Ratio to Si Content ratio (Atom %) | 2.4 43.6 | 2.2 38.5 | 1.0 17.9 |

As shown in Table 3, a ratio of carbon is significantly higher in SiOC particles (3) in Example 1 relative to SiOC particles (4) in Comparative Example 1.

Further, in the XPS spectra shown in FIGS. 6(a) and 6(b), a main peak of C1s of SiOC particles (3) is recognized to be much sharper than the main peak of SiOC particles (4). In view of sharpness of the main peak of C1s, and further capability of confirming a sub peak structure (shake-up peak) at 291 eV, existence of crystalline carbon was suggested, and therefore development of the graphene layer structure in the surface layer was substantiated.

Thus, the results of the XPS analysis also supported capability of producing the core-shell particles encapsulating the spherical core formed by containing the relatively large amount of graphite carbon in the shell in which the graphene layer structure is developed by adopting a relatively high heating rate during heat treatment of polysilsesquioxane serving as the raw material in a similar manner to the results of Raman spectrometry.

Powder Resistance Measurement

In order to further analyze properties of SiOC particles (3) and SiOC particles (4), the materials were provided for powder resistance measurement. Table 4 shows the results.

TABLE 4

Results of powder resistance measurement

| | Weight g | Resistance value (Ω) | Powder thickness (cm) | Specific resistance※ (Ω · cm) |
|---|---|---|---|---|
| Blank | — | 0.3473 | — | — |
| SiOC particles (3) (Example 1) | 0.890 | 0.3831 | 0.1847 | $6.09 \times 10^4$ |
| SiOC particles (4) (Comparative Example 1) | 0.820 | $1.0520 \times 10^6$ | 0.2184 | $1.51 \times 10^7$ |

※Specific resistance = (sample resistance value − blank resistance value) × sectional area of test sample (3.1416 cm$^2$)/powder thickness As shown in Table 4, a value of specific resistance is much smaller in SiOC particle (3) in Example 1 than in SiOC particle (4) in Comparative Example 1. Specifically, the specific resistance of SiOC particles (3) in Example 1 is about 0.6 Ω·cm, and the value is approximately comparable to the specific resistance of acetylene black generally used as a conductivity agent. More specifically, significantly reduced value of the specific resistance in SiOC particles (3) in Example 1 according to the invention means that, while SiOC particles (3) has SiOC-based specific core-shell structure, a shell portion thereof is in a carbon-rich state, and conductivity is significantly improved wholly as the particles.

Accordingly, SiOC particles (3) in Example 1 according to the invention were revealed to be a material capable of realizing preferred conductivity as a negative electrode material.

Results of Charging and Discharging Cycle Test

Figure 7:
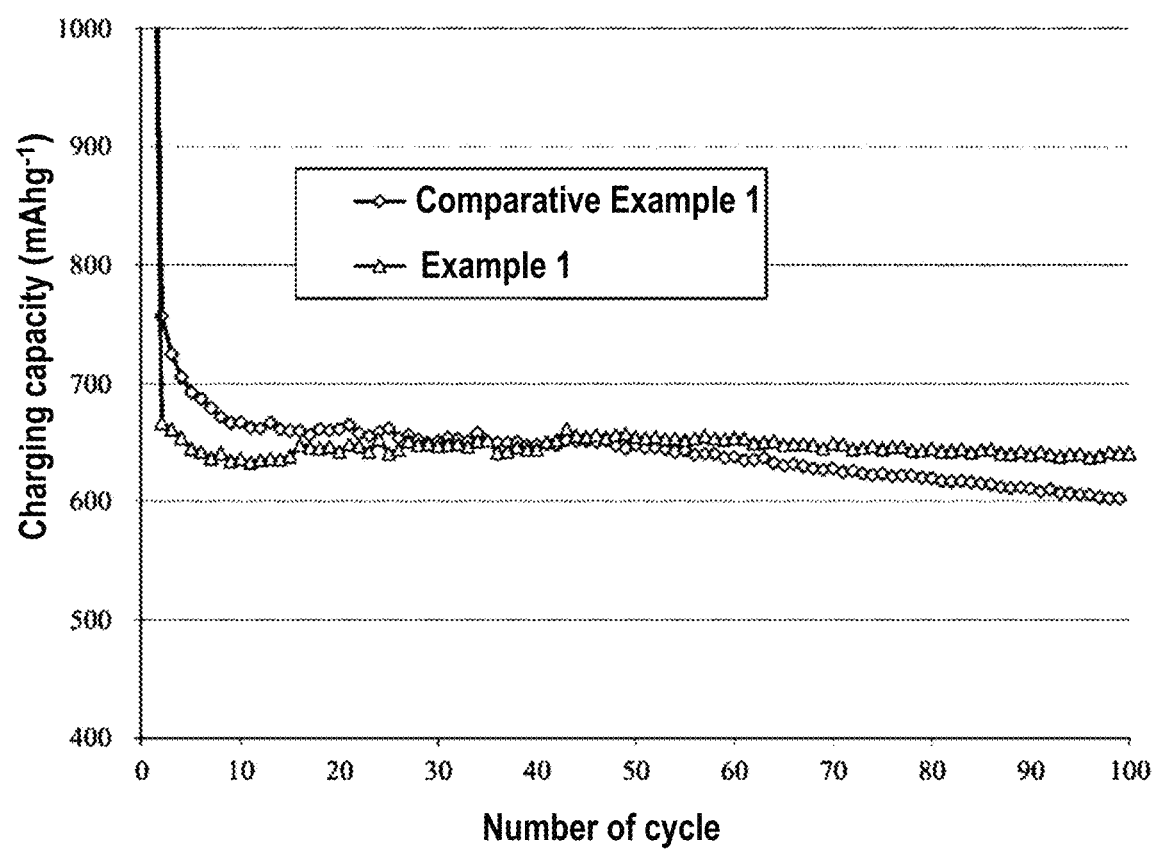
FIG. 7 is a diagram showing results of evaluation of cycle performance of a lithium ion secondary battery produced in Example 1 and Comparative Example 1.

FIG. 7 shows the results of a charging and discharging cycle test on the lithium ion batteries prepared in Example 1 and Comparative Example 1, respectively.

As shown in FIG. 7, the lithium ion secondary battery in which SiOC particles (3) according to the invention were used as the negative electrode active material in Example 1 was in a satisfactory range enough to withstand practical use, while initial efficiency was somewhat lower in comparison with the lithium ion secondary battery in Comparative Example 1, and was further excellent in the cycle performance.

According to the present Example, the invention was shown to be able to provide the negative electrode active material, the negative electrode material and the secondary battery, in which excellent cycle performance can be realized, while satisfactory initial efficiency (initial capacity) is maintained.

Example 2

SiOC particles were produced by providing the spherical polysilsesquioxane precursor (2) prepared in Synthesis Example 2 for rapid heat treatment in a manner similar to Example 1.

The SiOC particles have a predetermined core-shell structure of the invention, and can be utilized as a negative electrode active material exhibiting excellent cycle performance while satisfactory initial efficiency (initial capacity) is maintained in a similar manner to the SiOC particles (3) in Example 1.

INDUSTRIAL APPLICABILITY

The invention has high industrial applicability in a material or chemical field in which a SiOC material, a negative electrode active material, a negative electrode material and the like are produced, and an electrical and electronic field of a secondary battery, various electronic devices and the like.

What is claimed is:

1. A core-shell structure, comprising:
   a core containing at least silicon, oxygen and carbon as a constituent element and containing crystalline carbon and non-crystalline carbon as a constituent; and
   a shell encapsulating the core, and including a SiOC structure having a graphene layer; wherein
   the core-shell structure has an atomic composition represented by formula $SiO_xC_y$, wherein $0.5<x<1.8$, $1.0<y<5.0$; and
   the core-shell structure has a predetermined value of less than $1.0 \times 10^5$ Ω·cm in specific resistance determined by powder resistance measurement.

2. The core-shell structure according to claim 1, wherein volume resistivity determined by powder resistance measurement has a predetermined value of 1.0 Ω·cm or less.

3. The core-shell structure according to claim 1, wherein an intensity ratio $H_G/H_m$ in a Raman spectroscopy spectrum has a predetermined value of 1.80 or more.

4. The core-shell structure according to claim 1, wherein an intensity ratio $H_G/H_m$ in a Raman spectroscopy spectrum has a predetermined value of 2.20 or more.

5. The core-shell structure according to claim 1, wherein the core and the shell are chemically bonded.

6. The core-shell structure according to claim 1, wherein a peak intensity ratio $H_D/H_G$ in a Raman spectroscopy spectrum has a predetermined value of less than 1.50.

7. The core-shell structure according to claim 1, wherein a carbon/silicon molar ratio is 1.35 or more.

8. The core-shell structure according to claim 1, wherein a carbon/silicon molar ratio in the core is smaller than a carbon/silicon molar ratio in the shell.

9. The core-shell structure according to claim 1, wherein the shell includes an intermediate layer positioned on a surface of the core and a surface layer positioned on the intermediate layer, and the core, the intermediate layer and the surface layer each are characterized by a difference in a content ratio of carbon, and satisfy a relationship: (carbon/silicon molar ratio in the core)<(carbon/silicon molar ratio in the surface layer)<(carbon/silicon molar ratio in the intermediate layer).

10. The core-shell structure according to claim 1, wherein the core-shell structure has a shape of substantially spherical particles, and a particle size is in a range of 100 nanometers to 50 micrometers.

11. A composition for a negative electrode, containing the core-shell structure according to claim 1 as a negative electrode active material.

12. The composition for the negative electrode according to claim 11, further containing a carbon-based conductivity agent and/or a binder.

13. A negative electrode, containing the composition for the negative electrode according to claim 11.

14. A secondary battery, having at least one negative electrode according to claim 13.

15. The secondary battery according to claim 14, being a lithium ion secondary battery.

16. A method for producing a composition for a negative electrode, including obtaining of the composition for the negative electrode by using the core-shell structure according to claim 1 as a negative electrode active material.

* * * * *